United States Patent [19]
Aotake

[11] Patent Number: 5,732,067
[45] Date of Patent: Mar. 24, 1998

[54] OPTICAL DISC HAVING RECORDED THEREON A SIMPLIFIED PLAYBACK CONTROL SCRIPT WHICH IS INDEPENDENT OF THE CPU OF THE INFORMATION RECORDING/REPRODUCING APPARATUS USED TO RECORD AND/OR REPRODUCE THE OPTICAL DISK

[75] Inventor: Hidenori Aotake, Kanagawa, Japan

[73] Assignee: Sony Corporation, Tokyo, Japan

[21] Appl. No.: 688,053

[22] Filed: Jul. 31, 1996

[30] Foreign Application Priority Data

Aug. 2, 1995 [JP] Japan ................................ 7-216766

[51] Int. Cl.$^6$ ................................................ G11B 7/00
[52] U.S. Cl. .................. 369/275.3; 369/32; 369/97
[58] Field of Search ........................ 369/275.3, 32, 369/48, 47, 58, 54, 97; 348/384, 472; 386/45

[56] References Cited

U.S. PATENT DOCUMENTS

| | | | |
|---|---|---|---|
| 5,414,686 | 5/1995 | Iitsuka | 369/48 |
| 5,463,605 | 10/1995 | Nishida et al. | 369/47 |
| 5,570,340 | 10/1996 | Lee et al. | 369/275.3 |
| 5,594,709 | 1/1997 | Nagano et al. | 369/32 |

FOREIGN PATENT DOCUMENTS

| | | |
|---|---|---|
| 0391771 A1 | 10/1990 | European Pat. Off. . |
| 0424903 A2 | 5/1991 | European Pat. Off. . |
| 0437093 A2 | 7/1991 | European Pat. Off. . |
| 0510834 A2 | 10/1992 | European Pat. Off. . |
| 0542377 A2 | 5/1993 | European Pat. Off. . |
| 0689206 A1 | 12/1995 | European Pat. Off. . |
| 2664730 | 1/1992 | France . |

*Primary Examiner*—Nabil Hindi
*Attorney, Agent, or Firm*—Limbach & Limbach L.L.P.

[57] ABSTRACT

An information recording medium having recorded thereon picture information and/or speech information, a plurality of items consisting of the picture information and/or the speech information, and reproduction control information comprised of a plurality of lists for controlling the reproduction of the items, wherein at least a portion of the lists includes item information specifying one or more items reproduced in accordance with the lists and pointers represented by an offset from a leading end of the reproduction control information specifying another list to be linked, and wherein at least one of the lists is a first list including the item information specifying the one or more items, a plurality of pointers associated with plural lists branched according to a user selection and a plurality of region data defining regions of alternatives for menu display of the contents of the pointers according to a priority sequence.

10 Claims, 17 Drawing Sheets

OPTICAL DISC HAVING RECORDED THEREON A SIMPLIFIED PLAYBACK CONTROL SCRIPT WHICH IS INDEPENDENT OF THE CPU OF THE INFORMATION RECORDING/ REPRODUCING APPARATUS USED TO RECORD AND/OR REPRODUCE THE OPTICAL DISK

BACKGROUND OF THE INVENTION

This invention relates to an information recording medium and an information reproducing apparatus. For example, it relates to an information reproducing apparatus for reproducing the information supplied by an information recording medium applied to e.g. a CD-ROM or CD-I which are read-only memories employing so-called compact discs.

Among the information recording media, there is a so-called compact disc comprised of an optical disc having audio signals recorded thereon, that is a compact disc-digital audio (CD-DA).

However, with the CD-DA, referred to hereinafter as audio CD, sound-only data is recorded on a unit termed a track, so that it is not possible to record the program or script controlling the playback function.

Thus, only the linear reproduction or the reproduction in the sequence designated by the user is carried out, such that there is not the degree of freedom even if the purveyor of the contents intended to reproduce signals in an alternative sequence.

On the other hand, it is possible with the so-called CD-I (CD-Interactive) to handle the sound, moving pictures or still pictures as data files.

However, data accessing is complex through a file system. Although complex operation may be achieved depending on program types, since the program is a code depending on the player's CPU (central processing unit), there exist a large number of hardware-related limitations, while the program itself is difficult to formulate.

OBJECT AND SUMMARY OF THE INVENTION

In view of the foregoing, it is an object of the present invention to provide an information recording medium which is capable of recording data of moving still pictures or speech as a data file, suffers from only little limitations with respect to the hardware for reproduction and which is capable of rendering the data recorded on the hardware accessible for reproduction, and an information reproducing apparatus for reproducing the information recording medium.

For overcoming the above problems, the present invention provides an information recording medium having recorded thereon picture information and/or speech information, a plurality of items consisting of the picture information and/or the speech information, and reproduction control information comprised of a plurality of lists for controlling the reproduction of the items, wherein at least a portion of the lists includes item information specifying one or more items reproduced in accordance with the lists and pointers represented by an offset from a leading end of the reproduction control information specifying another list to be linked, and wherein at least one of the lists is a first list including the item information specifying the one or more items, a plurality of pointers associated with plural lists branched according to a user selection and a plurality of region data defining regions of alternatives for menu display of the contents of the pointers according to a priority sequence. apparatus for reproducing a picture information and/or speech information from an information recording apparatus having recorded thereon the picture information and/or the speech information, a plurality of items consisting of the picture information and/or the speech information, and reproduction control information comprised of a plurality of lists for controlling the reproduction of the items, wherein at least a portion of the lists includes item information specifying one or more items reproduced in accordance with the lists and pointers represented by an offset from a leading end of the reproduction control information specifying another list to be linked, and wherein at least one of the lists is a first list including the item information specifying the one or more items, a plurality of pointers associated with plural lists branched according to user selection and a plurality of region data defining regions of alternatives for menu display of the contents of the pointers according to a priority sequence. The information reproducing apparatus comprising reproducing means for reproducing the information.

The present invention also provides an information reproducing apparatus for reproducing the picture information and/or speech information from an information recording apparatus having recorded thereon the picture information and/or the speech information, a plurality of items consisting in the picture information and/or the speech information, and the reproduction control information comprised of a plurality of lists for controlling the reproduction of the items, wherein at least a portion of the lists includes the item information specifying one or more items reproduced in accordance with the lists and pointers represented by an offset from the leading end of the reproduction control information specifying an other list to be linked, an wherein at least one of the lists is a first list including the item information specifying the only one list, a plurality of pointers associated with plural lists branched according to the user selection and a plurality of region data defining regions of alternatives for menu display of the contents of the pointers according to the priority sequence, comprising reproducing means for reproducing the information recorded on the information recording medium, menu display control means for menu display of the contents of the first list in the priority sequence based upon the region data in the first list of the reproduction control data reproduced by the reproducing means, input means for inputting the selection information, output means for outputting the picture information and/or the speech information reproduced by said reproducing means, and control means for controlling the reproduction of each item by the reproducing means based upon the item information of the reproduction control information reproduced by the reproducing means. The control means switches the lists interpreted on the basis of the pointers when the entry of the selection information by the input means or the reproduction of all items indicated in the first list comes to a close.

The present invention also provides an information reproducing apparatus for reproducing the picture information and/or speech information from an information recording apparatus having recorded thereon the picture information and/or the speech information, a plurality of items consisting in the picture information and/or the speech information, and the reproduction control information comprised of a plurality of lists for controlling the reproduction of the items, wherein at least a portion of the lists includes the item information specifying one or more items reproduced in accordance with the lists and pointers represented by an offset from the leading end of the reproduction control information specifying other lists to be linked, an wherein at least one of the lists is a second list including a plurality of the item data specifying a plurality of continuously reproduced items and a plurality of region data defining the region of the alternative for menu display of the list contents, comprising reproducing means for reproducing the information recorded on the information recording medium, menu display control means for menu display of the contents of the second list based upon the region data in the second list of the reproduction control data reproduced by the reproducing means, input means for inputting the selection information, output means for outputting the picture information and/or the speech information reproduced by the reproducing means, and control means for controlling the reproduction of each item by the reproducing means based upon the item information of the reproduction control information reproduced by the reproducing means. The control means switches the lists interpreted on the basis of the pointer when the entry of the selection information by the input means or the reproduction of all items indicated in the second list comes to a close.

DETAILED DESCRIPTION OF THE PREFERRED EMBODIMENT

Figure 1:
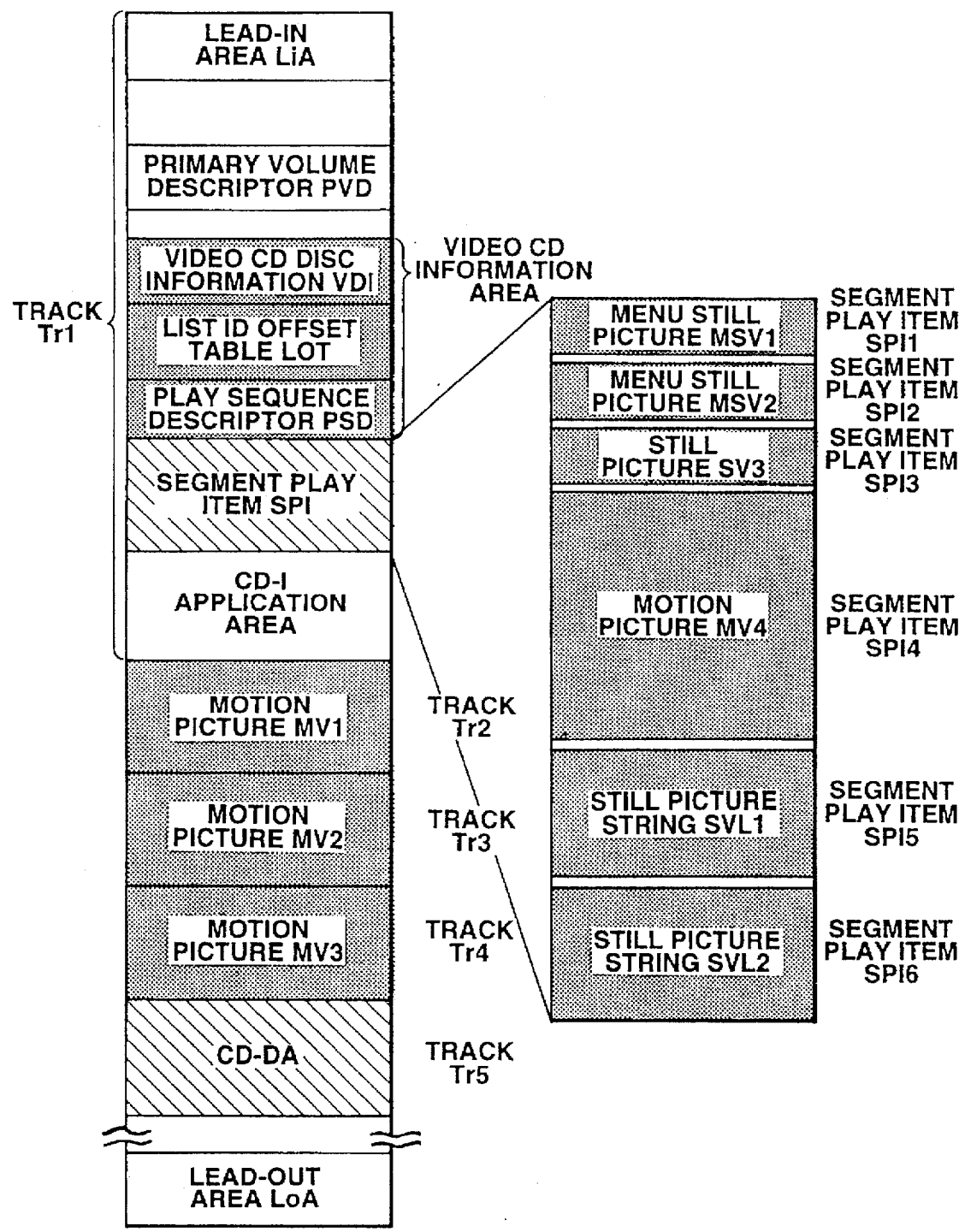
FIG. 1 illustrates a disc track arrangement of a playback control recorded on an information recording medium according to the present invention.

Referring to the drawings, preferred embodiments of the present invention will be explained in detail.

An information recording medium of the present embodiment has recorded, for example, segment play items (SPI) such as a menu of still pictures MSV1 and MSV2 and still pictures SV3, motion pictures MV1, MV2, MV3 and CD-DA as plural items, and a play sequence descriptor PSD as the playback control information, as shown in FIG. 1.

The play sequence descriptor PSD is made up of a play list (PL), a regioned play list (RPL), play item PL, a selection list (SL), a statement list (STL), a conditional branch list (CBL), a control list (CTL), a set stream ID list (SSIDL), an enable stream ID list (ESIDL), change volume list (CL), a change volume list type 2 (CL2), No Operation List (NOL) and an end list (EL). The play sequence descriptor is made up of a selection list SL, a play list PL, an end list (EL), a change volume list CL and a change volume list type 2, as will be explained subsequently.

The selection list SL, as the first list, includes a play item offset as a sole item information. The selection list SL also includes a next list offset, previous list offset and a cancel list offset, as first, second and third pointers, respectively, while also including a selection #n offset as plural pointers branching responsive to the user selection. Only a desired one of the above pointers may be provided if so desired. The selection list SL also includes a wait for time-out as later explained.

On the other hand, the play list PL as the second list includes the play item #n offset as the item information, while including the next list offset, previous list offset and cancel list offset, as first, second and third offsets, respectively. The play list includes the wait time, as later explained, as the information indicating the wait time. Each offset expresses plural bytes as one unit.

The end list, as the third list, indicates the end of interpretation of the play sequence descriptor PSD. The play sequence descriptor PSD includes the change volume list or the change volume list type 2, as the information for exchanging and reproducing plural information recording media.

The information recording medium of the present embodiment includes data contents as later explained as the information indicating the attributes of the respective items. The video CD disc information VDI of FIG. 1 includes the PSD size, for example, as the information indicating the size of the play sequence descriptor PSD.

The information recording medium of the present embodiment has recorded thereon list ID offset data (LOT) as a table for relating the identification codes of the respective lists with the associated offsets, as shown in FIG. 1.

The play sequence descriptor PSD is the information which is non-dependent on the object code and the operating system of a micro-computer. The information recording medium of the present embodiment is comprised of an optical disc and within the category of the CD-ROM.

In the present embodiment, the video data and the audio data, and data excluding the video and audio data, are given as examples, as later explained. The video data is recorded e.g. on tracks Tr2 to Tr4 and on segment play item SPI1 to SPI6 in the segment play item SPI, while the audio data is recorded in e.g. a track Tr5. The data excluding the video data and the audio data may be exemplified by a video CD disc, information VDI, list ID offset table LOT and play sequence descriptor PSD.

Figure 2:
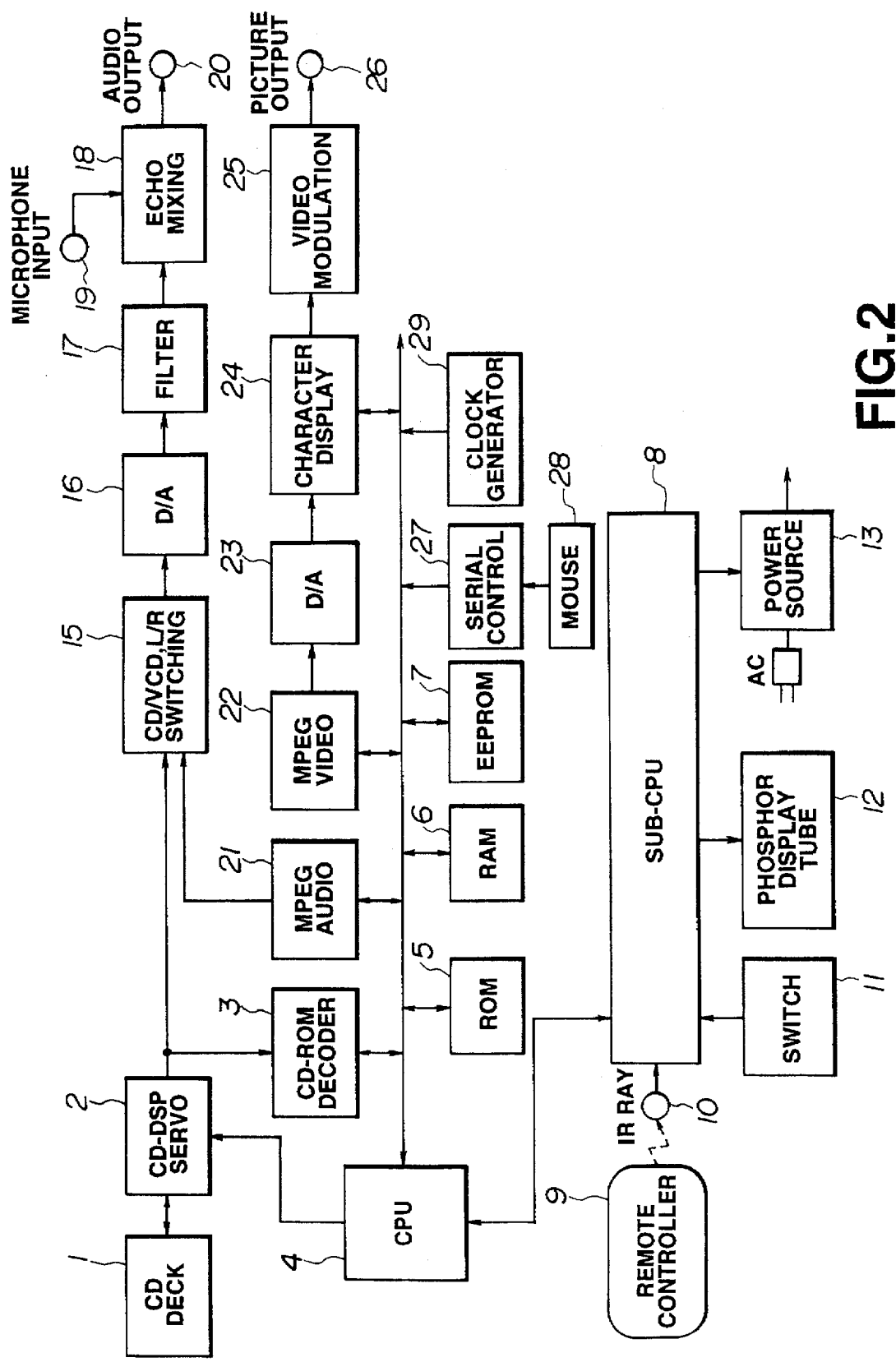
FIG. 2 is a schematic block circuit diagram showing the construction of an information reproducing apparatus embodying the present invention.

FIG. 2 shows a construction of an information reproducing apparatus embodying the present invention.

The information reproducing apparatus of the present embodiment reproduces an optical disc of the present embodiment (referred to hereinafter as a video CD) on which there are recorded plural items made up of moving pictures MV1 or MV2 (video data) and/or audio information (audio data) such as CD-DA, and the playback control information for controlling the reproduction of the plural items. At least a portion of the plural lists includes the item information indicating one or more items reproduced based upon the list and a pointer expressed by the offset from the leading end of the playback information indicating another connected list. The information reproducing apparatus includes a CD deck 1 as reproducing means for reproducing the information from the video CD of the present embodiment, a remote controller 9 and/or a switch 11 as inputting means for inputting the information of the user selection, a mouse or a switch 28 as input means for entering the selection by a user, an MPEG video decoder 22 and a D/A converting circuit 23 as means for outputting the reproduced picture information, an MPEG audio decoder 21 and D/A converting circuit 16 as outputting means for outputting the reproduced speech information, and a central processing unit (CPU) 4 as control unit, as shown in FIG. 2. The CPU 4 controls the playback of the respective items by the CD deck 1 based upon the item information in the predetermined list in the playback control information and, when the user's selection is entered by the remote controller 9 or the switch 11 or the reproduction of the total items shown in the predetermined list is finished, switches the interpreting list based upon the above pointer.

The above offsets in the optical disc (video CD) of the present embodiment are expressed in terms of plural bytes as one unit. In addition, the information reproducing apparatus of the present embodiment has a RAM 6 as storage means for storing at least a portion of the reproduced playback control information. The playback control information is the information which is not dependent on the operating system and the object code of the CPU 4 loaded on the information reproducing apparatus of the present embodiment. Thus the information reproducing apparatus of the present embodiment stores in a ROM 5 the program required for conversion of the non-dependent information for coping with the operating system and the object code of the CPU 4.

The CPU 4, for example, of the information reproducing apparatus of the present embodiment, also acts as timing measurement means for measuring the time based upon reference clocks from a clock generator 9. Thus the CPU interprets another playback control information when detecting that there is no input from the remote controller 9 or the switch 11 after lapse of a preset time (time-out as later explained). Meanwhile, the clock generator 9 also acts as the above-mentioned timing measurement means, in which case the information indicating the lapse of the above pre-set timing is routed to the CPU 4. Before proceeding to a detailed description of the construction shown in FIG. 2, the contents of the present invention will be explained.

A variety of standards are prescribed for the so-called compact disc (CD) depending on the types of recorded data.

Figure 3:
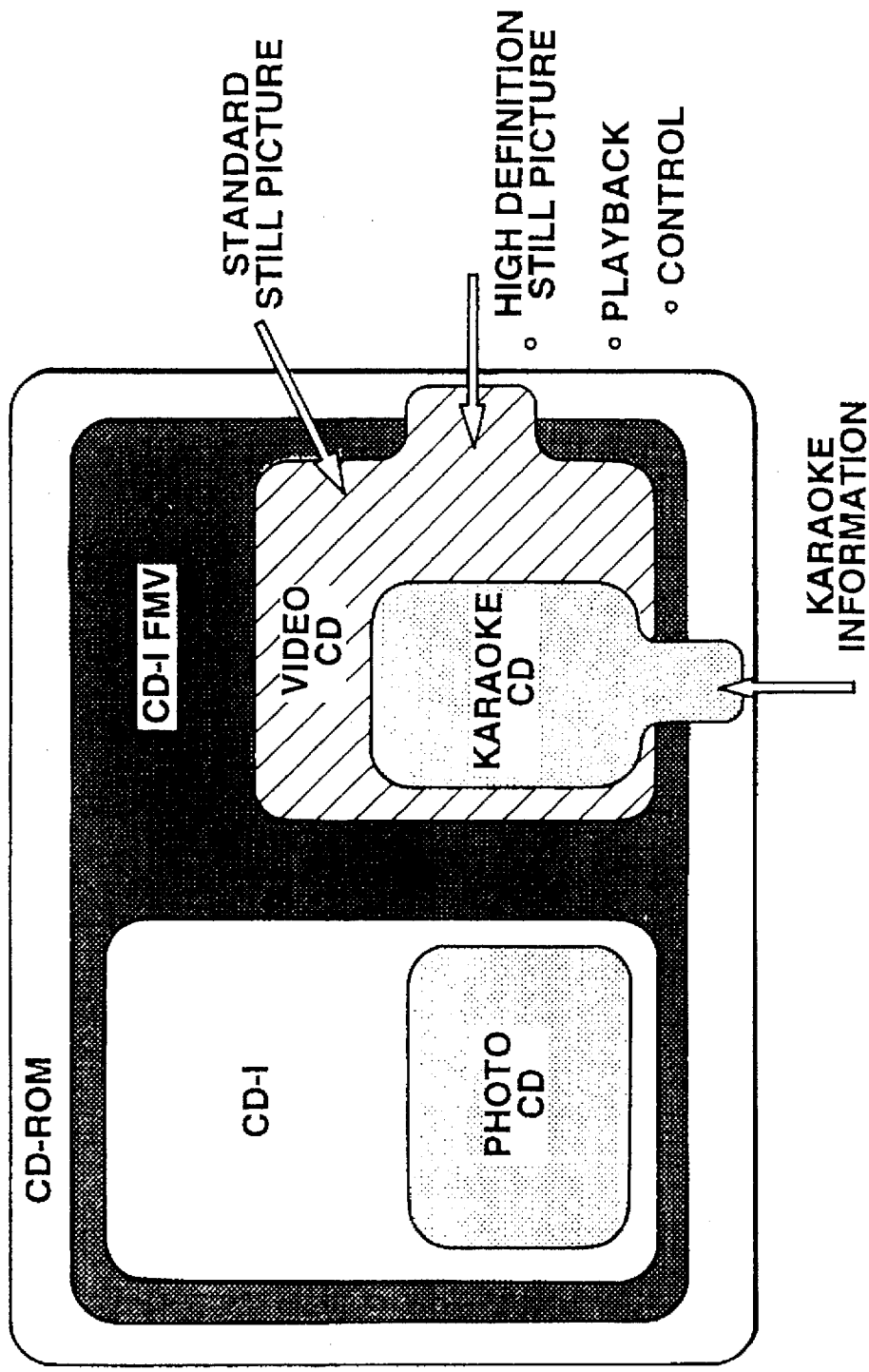
FIG. 3 illustrates the standard for the CD-ROM and that of the disc of the present embodiment by way of comparison.

That is, the CD standards are roughly classified into audio CD (CD-DA) for recording audio signals, and a CD-ROM for recording various data, as shown in FIG. 3. Of these, the format for the optical disc (video CD), which is the information recording medium of the present embodiment for recording video signals, is comprised in the category of the CD-ROM, and represents an extension of the so-called karaoke CD (CD animated picture karaoke) aimed at reproducing a moving picture in a simplified manner. The karaoke CD herein means an optical disc mainly used in a karaoke in which input audio signals from a microphone and music signals are mixed together.

The field of the household software is broad and includes not only the simplified moving picture reproduction but also the music software, education software and electronic publication software in which the moving picture and the still picture are combined together. For coping with these softwares, the design statements for a high definition still picture of 704×480 pixels and the function of playback control for realization of menu reproduction, such as are shown in Table 1, are added in the optical disc (video CD) of the embodiment of the present invention.

TABLE 1

| Physical Format | CD-ROM (XA) |
|---|---|
| Digital Video | Pursuant to MPEG1 |
|  | Pixel Size/Frame Frequency: |
|  | 352 × 240/29.97 Hz (NTSC) |
|  | 352 × 240/23.976 Hz (film) |
|  | 352 × 288/25 Hz (PAL) |
|  | Data Transfer Rate: |
|  | Max 1.152 Mbits/sec |
|  | Video Pack: 2296 bytes |
| Digital Audio | MPEG Layer 2 |
|  | Sampling Frequency: 44.1 kHz |
|  | Data Transfer Rate: 224 kbits/sec |
|  | Audio Pack: 2279 bytes |
| Reproducing Time | Max 74 min. |
| Number of Pixels | Standard Level: 352 × 240, 352 × 288 |
| of Still Picture | High Definition Level: 704 × 480, 704 × 576 |
| Playback Design | Menu Reproduction Employing Playback |
| Statements | Control, such as, Normal Playback, Slow, Pause |
| Video Signal Output | NTSC/PAL |
| Field of Application | Motion Picture, Karaoke, Music, Education, Photoalbum, etc. |

In addition, the recording format for the optical disc (video CD) of the present embodiment is a format compatible with the existing CD-I FMV (full-motion video). That is, the recording format for the video CD of the present embodiment is the bridge standard capable of being reproduced on a player capable of coping with the CD-I FMV standard and maintains standard integration and optical disc compatibility.

Since the optical disc (video CD) of the present embodiment does not specify an operating system, in distinction from the CD-I, so that it can be exploited on a game machine or a personal computer having loaded thereon a moving picture board for MPEG (moving picture expert group) for compression coding of moving pictures.

With the optical disc (video CD) of the present embodiment, data of an information portion, such as computer data is pursuant to a form 1 of the CD-ROM format, while audio or video data is pursuant to a form 2 thereof and file management follows ISO9660.

The video CD recording area is roughly comprised of a lead-in area LiA, a data area (tracks Tr1 to Tr99) and a lead-out area LoA, as shown in FIG. 1.

With respect to the CD-ROM XA format, the optical disc (video CD) of the present embodiment shown in FIG. 1 provides an area for recording the video CD disc information VDI, referred to hereinafter as video CD information portion, in a video CD information area. It is in this video CD information portion that a variety of the optical disc information data are recorded. In addition, there is provided in the video CD information portion of the track Tr1, an area for recording a list ID offset table LOT, referred to hereinafter as list ID offset table portion. In this list ID offset table portion are stored the identification information (ID) for the moving picture and the still picture recorded on the optical disc. On the other hand, an area for recording the play sequence descriptor PSD, referred to hereinafter as a playback control portion, is provided in the video CD information area. In this video CD information area, there is recorded the play sequence described in a list form.

In a segment play item SPI, data that can be used for a menu picture, such as a still picture, is adapted to be written. In the embodiment of FIG. 1, the segment play item SPI is made up of segment play items SPI1 to SPI6. In the segment play items SPI1 and SPI2, the menu still pictures MSV1 and MSV2 are written. In the segment play item SPI3, the still picture SV3 is written. Similarly, in the segment play item SP14 and in the segment play items SPI5 and SPI6, the motion picture MV4 and still picture strings SLV1 and SLV2 are written, respectively.

In the track Tr1, there is arrayed a CD-I application area. For reproducing the optical disc of the video CD format of the present embodiment on a CD-I FMV player, the player first reads the area and reproduces the disc in accordance with the application procedure. For reproducing the disc with an equipment in need of directory control such as a personal computer, file management is made in accordance with directory management shown in FIG. 4.

Figure 4:
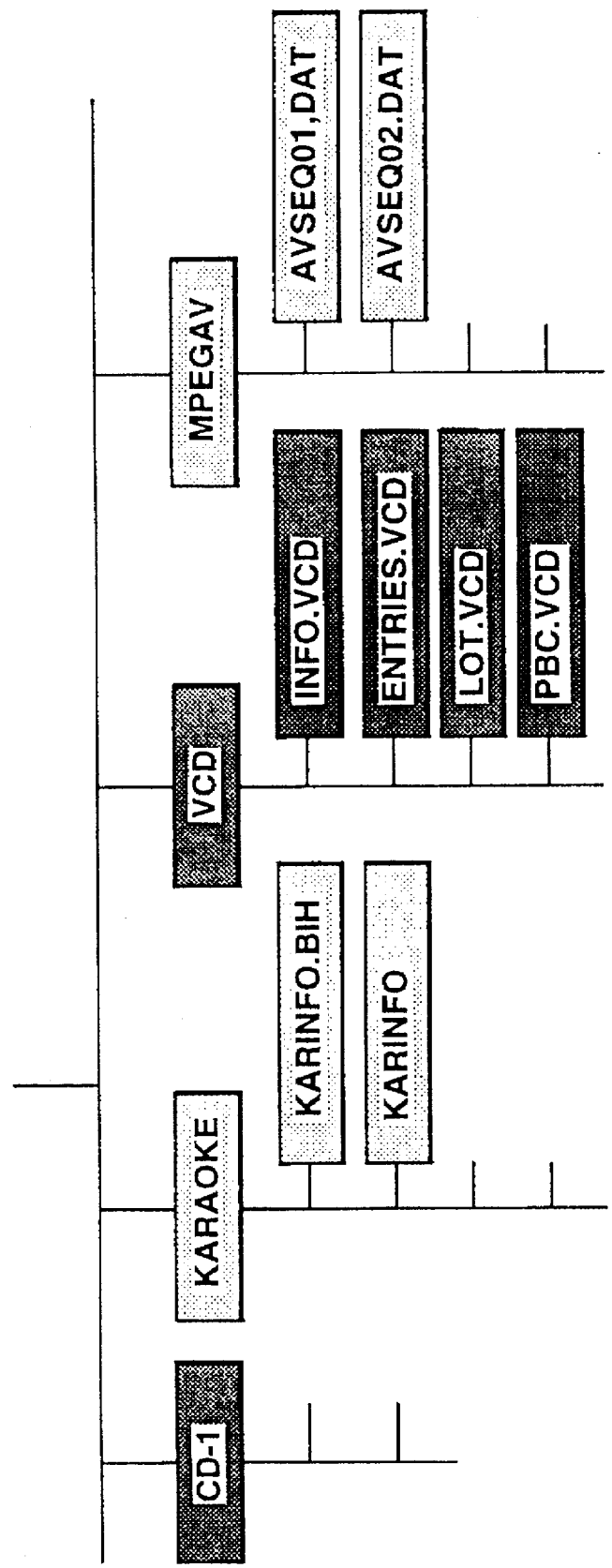
FIG. 4 illustrates the disc directory constitution.

That is, the directory of the video CD indicated as VCD in FIG. 4 is added to the conventional directory constitution consisting of CD-I, MPEG audio and video and karaoke, as shown in FIG. 4. In the directory of FIG. 4 for the video CD, the information for the video CD is stored in INFO.VCD. In the Directory for the VCD in FIG. 4, for example, the video VCD information is stored in INFO.VCD, while a start position of a moving picture and audio data of the MPEG standard is stored in ENTROES.VCD. In the LOT.VCD and PBC.VCD, a lot ID offset table LOT and the playback control information are stored, respectively.

The ordinary MPEG data is recorded in a track Tr2 ff. Thus the ordinary MPEG data can be coped with by up to the maximum of the track 99. It is noted that, with the recording format for the optical disc (video CD) of the present embodiment, not only the simplified interruptive software taking advantage of the playback control but also an optical disc for reproducing a high definition still picture using only the track Tr1 can be realized.

In the example of FIG. 1, data for the moving pictures MV1 to MV3 and data for the CD-DA are recorded on the tracks Tr2 to Tr4 and on a track Tr, respectively.

Figure 5:
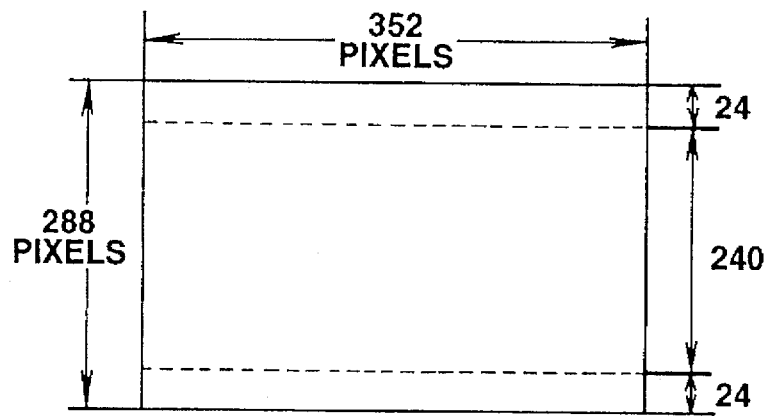
FIG. 5 illustrates the screen size fixed in the present embodiment.

Next, the recording format for the video signal (data) and audio signals (data) for the optical disc of the present embodiment conforms to MPEG1. About 1.2 Mbits per second and about 0.2 Mbits per second are usually allocated to the video data and to the audio data, respectively. The screen size for the picture 352 by 240 pixels and 352 by 288 pixels for NTSC signals (30 Hz) and motion picture films (24 Hz) and for the PAL signals (25 Hz), respectively, as shown in FIG. 5. The MPEG layer 2 is used as a format for audio data. The MPEG 2 audio data accommodates a wide range of the coding rate of 32 kbits per second to 384 kbits per second. In the present embodiment, the encoding rate is limited to 224 kbits per second in view of simplified software formulation and high sound quality. Meanwhile, the playback mode is stereo (2 channel) mode so that, for example, the channel 0 and channel 1 may be allocated to music and to music and singer's songs, respectively, for karaoke software application.

Figure 6:
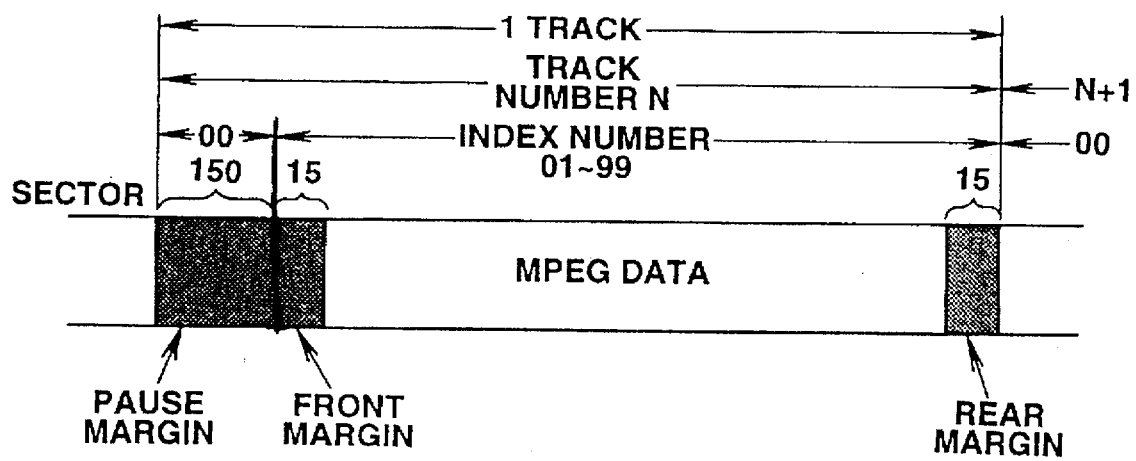
FIG. 6 illustrates the track constitution of the disc of the present embodiment.

FIG. 6 shows a track constitution of the optical disc (video CD) of the present embodiment. That is, the MPEG video data and audio data are recorded in an interleaved fashion on the optical disc. The video and audio data are recorded at a ratio of 6 to 1 on an average. On the assumption that track number retrieval may be made as in a conventional CD player, 150 sectors are set for a pause margin, while 15 sectors each are set for a front margin and a rear margin, respectively, for diminishing the effect on a bitstream on retrieval.

Figure 7:
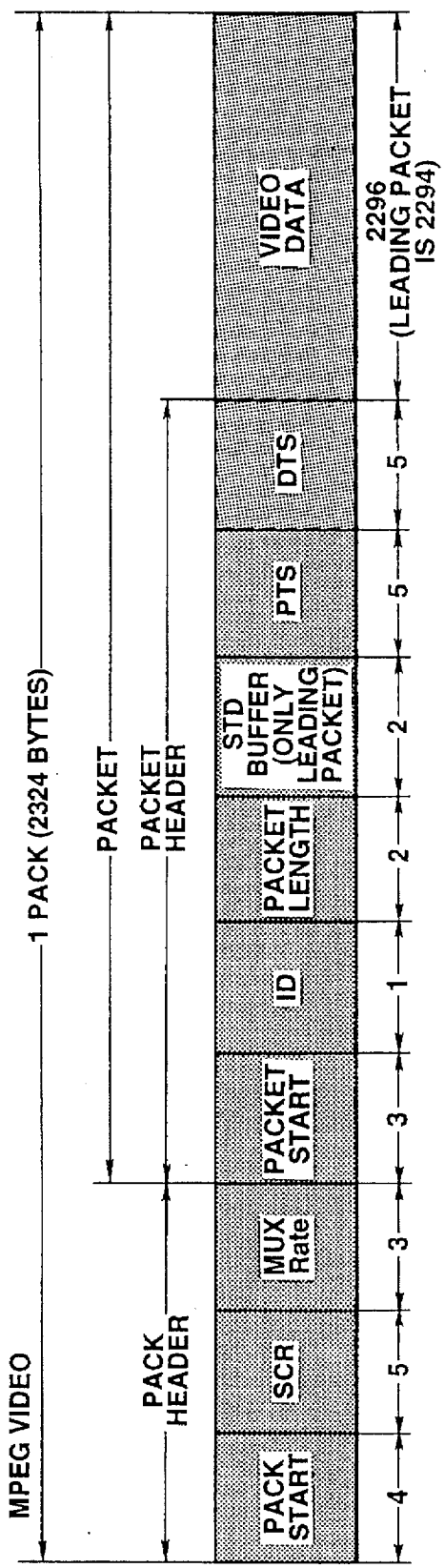
FIG. 7 shows a sector format of MPEG video data recorded on the disc of the present embodiment.
Figure 7:
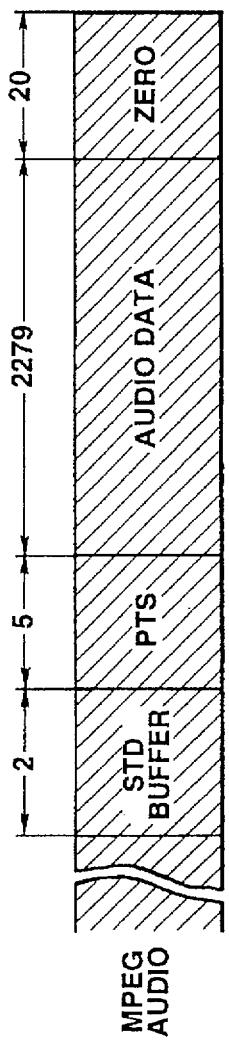

The sector format for the MPEG video data is comprised of a pack made up of a pack header and pack data, as shown in FIG. 7. Each pack is made up of 2324 bytes representing a 1-sector user data area of the CD-ROM. In FIG. 7, TS, DTS, SCR and STD denote a presentation time stamp, a decoding time stamp, a system reference clock and a system target decoder, respectively.

The sector format of the MPEG audio data is basically the same as that of the video data. However, 12 bytes, 13 bytes and 2279 bytes are allocated to the pack header, packet header and to the data portion, with the 2304 bytes as one pack, to which excess 20 bytes (20×0's) are appended so that the resulting 2324 bytes make up one pack in the case of video data.

In the present embodiment, the dialogue type playback consisting in a combination of a moving picture and a still picture is realized by the following playback control function. In the following description, the playback control function is also referred to as the play sequence descriptor function. The play sequence descriptor function includes, as main functions, a play list PL and a selection list SL, as later explained. The play list PL and the selection list SL describe the sequences of moving picture reproduction and menu reproduction, respectively. For accessing desired moving picture data or still picture data in accordance with the playback control function, reference is had to the addresses of the still picture and the moving picture stored in the list ID offset table LOT. The control data volume for realizing the playback control (play sequence descriptor) function is on the order of a maximum of 512 kbytes, as will be explained subsequently.

Next, the data handled with the optical disc (video CD) of the present embodiment (video data, audio data and data of the video CD information area) is explained.

The video data is data for a moving picture of the usual definition size (352×240/288) and data for a still picture of the high definition size (704×480/576). When the data for the still picture with high definition, data for the still picture of the same picture with the usual definition is inserted at all times.

The sub-header of each data is defined as shown for example in Table 2.

TABLE 2

| | File # | Channel # | Submode | Coding Information |
|---|---|---|---|---|
| Moving Picture | xx | $01 | %x11x001x | $0F |
| Normal Definition Still Picture | xx | $02 | %x11x001x | $1F |
| High Definition Still Picture | xx | $03 | %x11x001x | $3F | where $ and % denote hexadecimal number and binary numbers, respectively.

The audio data of up to eight streams at the maximum is recognized. The sampling frequency is fixed at 44.1 kHz. Five bit rates are used, namely 64, 128, 192, 224 and 384 kbits for the stereo/intensity stereo/dual channel, while four bit rates are used, namely 32, 64, 96 and 192 kbits for the monaural channel.

The sub-header for each data is prescribed as shown for example in Table 3.

TABLE 3

| | File # | Channel # | Submode | Coding Information |
|---|---|---|---|---|
| Channel 0 | xx | $01 | %x11x010x | $7F |
| Channel 1 | xx | $02 | %x11x010x | $7F |
| Channel 2 | xx | $03 | %x11x010x | $7F |
| Channel 3 | xx | $04 | %x11x010x | $7F |
| Channel 4 | xx | $05 | %x11x010x | $7F |
| Channel 5 | xx | $06 | %x11x010x | $7F |
| Channel 6 | xx | $07 | %x11x010x | $7F |
| Channel 7 | xx | $08 | %x11x010x | $7F |

The data for the video information area includes the video CD disc information VDI, list ID offset table LOT and the play sequence descriptor PSD as data files.

These sub-headers are prescribed as shown for example in Table 4.

TABLE 4

| | File # | Channel # | Submode | Coding Information |
|---|---|---|---|---|
| Data File | $00 | $00 | %x00x100x | $00 |

The construction of the video CD disc information VDI shown in FIG. 1 is explained. The video CD disc information VDI is fixedly stored at a sector "75". In this sector is stored the basic information of the video CD.

The contents are as shown for example in Table 5.

TABLE 5

| Position (Byte Position: BP) | Summary | Contents | Size |
|---|---|---|---|
| BP 1-8 | ID String | "VIDEO-CD" | 8 bytes |
| BP 9-10 | Version No. | $0100 | 2 bytes |
| BP 11-18 | Disc ID | | 8 bytes |
| BP 19-22 | PSD Size | | 4 bytes |
| BP 23 | Offset Base | 8(Fixed) | 1 byte |
| BP 24 | Reserved | $00 | 1 byte |
| BP 25-26 | Number of List ID | | 2 bytes |
| BP 27-154 | Disc Title | | 128 bytes |

The ID string denotes a character string for ID for identification of the video CD, while the version number (version No.) denotes the version number for the video CD.

The disc ID and the PSD size denote the ID number proper to the optical disc and the size (byte number) of the play sequence descriptor PSD, respectively. The PSD size of 0 indicates an optical disc devoid of the play sequence descriptor PSD. The offset base denotes the base of the offset employed in the play sequence descriptor PSD. It is fixed at 8 in Version 1. The offset is multiplied by the base, which is 8, for calculating the address. The number of list ID (num. of list ID) and the disc title denote the number of IDs written in the list ID offset table LOT and the title of the optical disc, respectively.

The construction of the list ID offset table LOT shown in FIG. 1 is explained. The location where the list ID offset table LOT is stored is fixed at a sector "76"–"107".

The list ID offset table LOT is a table showing the list ID attached to the selection list SL and the play list PL with respective offsets. If the user directly designates the ID, start can be made at the moving picture (play list) or the menu (selection list) associated therewith. If the user designates the ID and causes only one sector containing the ID offset to be read out, it can be known from which point the list is to be followed. That is, the list ID offset table LOT is data that is not required to be put in the memory during ordinary playback. If, during playback of the play list PL and the selection list SL, the list ID is displayed in a display tube of a player, such as a track number, it is possible for the user to memorize the number if he or she desired to view the menu or the moving picture from the outset and to designate the number (list ID) at a later time for re-check from the first portion of the list. If there are many list IDs, a maximum of 32 sectors are required for the list ID offset table LOT.

In the version 3, a maximum number of sectors are set aside. The ID offsets not in use are stuffed with $FFFF. The maximum number of 32 sectors is used because at least 14 bytes are required for one play list PL and, if it is expressed by offset values, it is stored in two offsets (16 bytes). If the entire range that can be expressed by 2-byte offsets (64 k offsets) is the play list PL, since there is left up to a maximum number of 32 k list IDs, so that it suffices if a maximum of 32 k area (64 kbytes=32 sectors) is procured.

The list ID offset table LOT as the sector addresses has a value shown for example in Table 6.

TABLE 6

| "00:03:01" | Setup Offset | $0000 2 bytes |
|---|---|---|
| | List ID1 Offset | $xxxx 2 bytes |
| | List ID2 Offset | $xxxx 2 bytes |
| | List IDN Offset = N) | $xxxx 2 bytes (Num. of List ID |
| | Non-used List ID | $0000 2 bytes |
| "0:03:32" | Non-used List IS "00:02:32) | $0000 2 bytes (Last of |

The construction of the play sequence descriptor PSD in FIG. 1 is explained.

The play sequence descriptor PSD is stored in the sector "108" (Max "363"). In this location are put the actual play list PL, region play list RPL, selection list SL, statement list STL, conditional branch list CBL, control list CTL, set stream ID list SSIDL, enable stream ID list ESIDL, change volume list CL, change volume list type 2CL2, no operation list NOL and end list EL. At the leading end are put a play list PL reproduced first or a selection list SL. The maximum allowable size for the play sequence descriptor PSD is 512 kbytes, that is, 2 byte offset (64 k) offset base (8)=512 kbytes=256 sectors=3 sec 31 frames. It suffices to read out and reproduce only a necessary portion (e.g., RAM 6 of FIG. 6). If there is memory capacity allowance, it suffices to store the entire play sequence descriptor PSD in a memory during e.g. loading of the optical disc.

The construction of the play list PL, play item PI, selection list SL and end list, making up the play sequence descriptor PSD, will be explained in detail. As common terms, the offset means the address information indicating the position where a list, for example, is stored, that is a location as counted from the leading end when the play sequence descriptor PSD in its entirety is virtually put in the memory. As explained in connection with the offset base of the video CD disc information VDI, 1 offset corresponds to 8 bytes. It is expressed by 16-bit binary (bi-level values).

The play list PL is now explained.

The play list describes a reproduction sequence not containing branching. The construction of the play list PL is shown for example in Table 7.

TABLE 7

| Play Last Header: PLH | 1 byte |
|---|---|
| Number of Play Items: NOI | 1 byte |
| Last ID Number: IDN | 2 bytes |
| Previous List Offset: PLO | 2 bytes |
| Next List Offset: NLO | 2 bytes |
| Cancel List Offset | 2 bytes |
| Wait Time | 1 byte |
| Reserved | 1 byte |
| From Play Item #1 Offset | |
| To Play Item #end Offset | 4 bytes each |

The play header PLH is a header indicating the play list ($10).

The number of play item NOI denotes the number of items described in the play list PL and is expressed by the binary (bi-level value).

The list ID number IDN writes the number proper to the list. By displaying the number on the screen or an indicator of a phosphor display tube 12 of FIG. 2, the user is apprised of the position of the list currently reproduced. It is possible for the user to start reproduction at an optional list by the direct list number selection function of the player. This is a so-called chapter select function. If the list does not permit direct access in accordance with the intention of the software producer, the list ID number is set to 0. At this time, no list ID number is displayed on the player, or a previous list ID number is displayed. The play list PL put on the offset $0000 or the selection list SL is set to $0001.

The previous list offset PLO indicates the offset where a list to which processing is transferred when using the previous function is stored. If no previous function is required, $FFFF is set.

The next list offset NLO denotes the offset where there is stored a list to which processing is transferred on completion of execution of the total items or on employing the next function. If no next function is required, $FFFF is set.

The cancel list offset denotes the offset in which there is stored a list to which processing is transferred when employing the cancel function. If no cancel function is required, $FFFF is set.

The wait time registers the wait time after execution of one item. Since only one wait time can be set within the same play list PL, it is necessary to modify the play list PL if it is desired to modify the wait time. The LSB of the wait time corresponds to 0.5 sec. The wait time of $00 and $01 denotes that no waiting is made after reproduction and waiting for 0.5 second after reproduction before reproduction of the next item, or processing is transferred to the next list on completion of the total items, respectively. $FF indicates waiting until the user's action.

The seamless flag (Seamless flag) specifies the site of execution of the next play item PI etc. if the player gives some instructions during reproduction of plural play items PI. If the player gives no instructions, reproduction is continued as before.

The play item #n·offset (play item #n offset) denotes the offset of the item to be reproduced. The maximum value of n corresponds to the number of play item NOI.

The regioned play list RPL for specifying the predetermined fixed region of the play list PL is explained. The regioned play list RPL is a list for allowing the user to select the menu.

The selection is done by a numerical figure from a commander etc. or via coordinates on the menu displayed on the screen. The region specifies this coordinate. If the alternative is selected by the menu, the region specifies an area so that selection will be made in a similar manner not only with a player of the type in which election is done by pressing a number button as with a remote controller of a CD player but also with the type of the player in which a certain area on the screen is selected by clicking with a mouse as in a CD-I. The area is specified by a rectangle by position information of the diagonal lines. Specifically, the entire screen surface is divided into 256×256 mesh with the upper left corner being (0, 0) and the lower right corner being (255, 255) so that a region is represented by an upper left coordinate and a lower right coordinate (x, y)–(x', y'). Each region is made up of four bytes x, y, x' and y' arrayed in this order. For example, a region (20, 10) (100, 40) is represented by four bytes of $14, $0A, $64 and $28. The construction of the regioned play list RPL is as shown for example in Table 8.

TABLE 8

| Regioned Play List Header RPH | 1 byte |
|---|---|
| Number of Play Items NOI | 1 byte |
| List ID Number IDN | 2 bytes |
| Previous List Offset | 2 bytes |
| Next List Offset | 2 bytes |
| Cancel List Offset | 2 bytes |
| Wait Time | 1 byte |
| Seamless Flag | 1 byte |
| Previous Region | 4 bytes |
| Next Region | 4 bytes |
| Cancel Region | 4 bytes |
| from Play Item #1 Offset to Play Item #nd Offset | each 4 bytes |

The regioned play list header is a header specifying a regioned play list P1 and is set to $20.

In the list ID number, the number proper to the list is entered. By displaying the number on an indicator such as a display screen or on a phosphorescent display tube 12 in FIG. 2, the user is apprised of the position of the list being reproduced. By the direct list number selecting function, the user is able to start the reproduction from an arbitrary list. This is a function corresponding to the so-called chapter selecting function. If the software does not permit of direct accessing by the producer's intention, the list ID number is set to 0. At this time, no list ID number is displayed on the player, or a previous list ID number is displayed. The list ID number of the play list PL or the selection list SL is set to $0001.

The previous list offset indicates an offset to which processing is transferred when the previous function is used. If no previous function is needed, the offset is set to $FFFF.

The next list offset specifies an offset storing the list to which the processing is transferred when the execution of all stated items has come to a close or the next function has been used. This value needs be entered without fail.

The cancel list offset specifies an offset storing a list to which processing is transferred when the cancel function has been used. If no cancel function is needed, the offset is set to $FFFF.

The wait time registers the wait time after execution of each play item. Since only one wait time can be set within the same play list PL, the play list PL needs to be changed if desired to change the wait time for each play item. The LSB of the wait time is 0.5 sec. The value of $00 means no waiting after reproduction while the value of $01 means reproduction of next item after waiting for 0.5 second after reproduction or transferring the processing to the next list after the end of item reproduction. The value of $FF means waiting until an action by the user.

The seamless flag (Seamless flag) specifies that reproduction is continued if the player issues no instructions when plural play items PI are reproduced. If the player gives no instructions, the flag specifies the site of execution of the next play item PI.

The play item #n offset specifies the offset of an item to be reproduced. The maximum value of "n" corresponds to the number of the play item NOI.

The previous region, next region and the cancel region specify three different fixed regions for allowing three types of inputs using a pointing device, such as a mouse. These predetermined fixed regions of the play list PL are obtained by splitting the screen into three portions, which are the previous region, next region and the cancel region looking from the left. In the previous region, there is stored a list for transferring to the previous processing if the user gives instructions using a pointing device, such as a mouse, or directly touches the screen. In the cancel region and in the next region, there are stored lists for canceling the previous operation or transferring to the next operation.

The play item #n offset specifies the item of the offset to be reproduced. The maximum number of n corresponds to the number of play items I.

The play item PI states the contents and the position on the optical disc of each item comprising a video/audio stream.

The construction of the play item PI is shown for example in Table 9.

TABLE 9

| | |
|---|---|
| Start Logical Sector Address (Start LSA) | 4 bytes |
| End Logical Sector Address (End LSA) | 4 bytes |
| Stop System Time Clock (STC) | 4 bytes |
| File Number | 1 byte |
| Data Contents | 1 byte |

The start logical sector address (start LSA) of the play item PI specifies the leading sector number storing the bitstream and described in a binary number.

The end logical sector address (end LSA) of the play item PI specifies the end sector number storing the bitstream and described in a binary number. If all sectors cannot be accessed by, for example, fast playback during item reproduction, overrun may be prohibited by recognizing the end boundary.

The stop decoding system time clock STC sets the clock frequency to, for example, 90 kHz to 45 kHz by selecting the information of upper 32 bits of the 33 bits.

The file number designates the file number of data stored on the optical disc. The file number corresponds to the value of the sub-header of the form 1 and 2 sectors.

The data contents denote the attributes of data stored on the optical disc. The meanings of the respective bits are as shown in Table 10.

TABLE 10

| | | |
|---|---|---|
| bit [1,0] | 00 | Audio Data Absent |
| | 01 | Single Stream Audio |
| | 10 | Multi Stream Audio |
| | 11 | Reserved |
| bit [3,2] | 00 | Video Data Absent |
| | 01 | Normal Definition |
| | 10 | Only High Definition |
| | 11 | Normal Definition/High Definition |
| bit [5,4] | 01 | Moving Picture |
| | 00 | Still Picture |
| bit [6, 5] | | Reserved |
| bit [7] | 1 | CD - ROM |
| | 0 | CD - DA |

Similarly to the above-mentioned regioned play list RPL, the selection list SL is a list for the user to select the menu. The construction of the selection list SL is as shown in Table 10.

TABLE 10

| | |
|---|---|
| Selection List Header | 1 byte |
| Number of Play Regions: NOR | 1 byte |
| List ID Number | 2 bytes |
| Error List Offset | 2 bytes |
| Time-out List Offset | 2 bytes |
| Wait For Time-out | 1 bytes |
| Seamless Flag | 1 bytes |
| Play Item Offset | 2 byte |
| From Sections #1 (Selections #1) | |
| To Sections #NOR (Selections #NOR) | 4 bytes each |

The selection list header denotes the selection list SL. The corresponding information is $30.

The number of regions (NOR) denotes the number of regions stated in the list.

The list ID number, previous list offset and the cancel list offset are the same as those for the play list PL.

The next list offset NOL denotes an offset in which there is stored a list to which processing is transferred when employing the next function.

The error list offset denotes the offset where there is stored a list to which processing is transferred when the offset corresponding to the selected number has not been registered in the selection table.

The time-out offset denotes an offset where there is stored a list to which processing is transferred when selection has not been made after lapse of time as designated by the wait time.

The wait for timeout denotes the wait time until time-out. The LSB of the wait for time-out corresponds to 0.5 sec. In the wait for timeout, $00, $01 and $FF denote not-wait, wait for 0.5 sec and wait until user's selection, respectively.

The seamless flag (Seamless flag) specifies that, if the player gives no instructions when plural play items PI are reproduced, the reproduction is to be continued. If the player gives any instructions, the flag specifies the site for executing the next play item PI etc.

The play item offset denotes the offset of an item reproduced for displaying a menu screen or the like.

The selections #n (Selections #n) are arrayed in the order of the decreasing priority sequence. Thus the player sequentially checks the selections from #1 to skip to an offset corresponding to the input number or region. Specifically, the selections # consist of eight bytes, as shown for example in Table 12, with the first one byte being not in use. The next one byte is a number (Number) selected by the user. The next two bytes represent an offset of the reproduced item and the last four bytes represent a region corresponding to the offset.

TABLE 12

| Reserved | 1 byte |
|---|---|
| Number | 1 byte |
| List Offset | 2 bytes |
| Region | 4 bytes |

The above number (Number) is specifically of a value ranging from 1 to 99, as shown for example in Table 13. 0 and 100 ($64) to 251 ($FB) are not used (reserved), while 252 ($FC), 253 ($FB), 254 ($FE) and 255 ($FF) denote previous list, next list, cancel and default, respectively.

TABLE 13

| 0 | Reserved |
|---|---|
| 1–99 | Number |
| 100–$FB | Reserved |
| $FC | Previous |
| $FD | Next |
| $FE | Cancel |
| $FF | Default |

The statement list (Statement List) is a list for calculations and has a structure as shown for example in Table 14. That is, the list is comprised of a 1-byte statement list header (Statement List Header, usually $40 to $5F), a 4-byte operand (Operand), a 1-byte reserved (Reserved) and 2-byte next list offset (Next List Offset), totalling 8 bytes.

TABLE 14

| Statement List Header | 1 byte |
|---|---|
| Operands | 4 bytes |
| Reserved | 1 byte |
| Next List Offset | 2 bytes |

The operands of the above-mentioned statement list STL are as shown for example in Table 15. If the opcode is $40, the operand is "00dddvv" meaning that dddd is substituted for vv.

TABLE 15

| Opcodes | Operands | Meaning |
|---|---|---|
| $40 | 00 dddd vv | vv=dddd |
| $41 | xx 0000 vv | vv=xx |
| $42 | xx dddd vv | vv=xx+dddd |
| $43 | xx yy 00 vv | vv=xx+yy |
| $44 | xx dddd vv | vv=xx–dddd |
| $45 | xx yy 99 vv | vv=xx–xy |
| $46 | xx dddd vv | vv=xx*dddd |
| $47 | xx yy 00 vv | vv=xx*yy |
| $48 | xx dddd vv | vv=xx/dddd |
| $49 | xx yy 00 vv | vv=xx/yy |
| $4A | xx dddd vv | vv=xy MOD dddd |
| $4B | xx yy 00 vv | vv=xx MOD dddd |
| $4C . . . $4F | reserved | reserved |
| $50 | xx dddd vv | vv=xx&dddd |
| $51 | xx yy 00 vv | vv=xx&yy |
| $52 | xx dddd vv | vv=xx|dddd |
| $53 | xx yy 00 vv | xx=xx|yy |
| $54 | xx dddd vv | vv=xx XOR dddd |
| $55 | xx yy 00 vv | vv=xx XOR yy |
| $56 | 00 dddd vv | vv=random(dddd),dddd>0 |
| | | vv=random(xx),xx>0 |
| $57 | xx 0000 vv | reserved |
| $58 . . . $5F | reserved | |

The conditional branch list CBL is a list specifying branching and has a structure shown for example in Table 16. Thus the list is made up of a 1-byte conditional branch list header, using $60 to $6F, 3-byte operands, a 2-byte true list offset, and a 2-byte false list offset, totalling 8 bytes.

TABLE 16

| Conditional Branch List Header | 1 byte |
|---|---|
| Operands | 3 bytes |
| True List Offset | 2 bytes |
| False List Offset | 2 bytes |

The operands of the above-mentioned conditional branch list CBL is as shown for example in Table 17. If the opcode is "60", the operand is "vvdddd". If dddd is equal to vv, it specifies a list offset of an item for true conditional branch list CBL.

TABLE 17

| Opcodes | Operands | Meaning |
|---|---|---|
| $60 | vv dddd | vv==dddd |
| $61 | vv xx 00 | vv==xx |
| $62 | vv dddd | vv!=dddd |
| $63 | vv xx 00 | vv!=xx |
| $64 | vv dddd | vv>=dddd |
| $65 | vv xx 00 | vv>=xx |
| $66 | vv dddd | vv>=dddd |
| $67 | vv xx 00 | vv>=xx |
| $68 | vv dddd | vv<=dddd |
| $69 | vv xx 00 | vv<=xx |
| $6A | vv dddd | vv<dddd |
| $6B | vv xx 00 | vv<xx |
| $6C | vv dddd | test bit dddd of vv, 0<=dddd<=15 |
| $6D | vv xx 00 | test bit xx of vv, o <=xx <=15 |
| $6E . . . $6F | reserved | reserved |

The control list CTL (Control List) is a list specifying the number of audio and is constructed as shown in Table 18. That is, the list is made up of a 1-byte control list header (Control List Header, $70), a 1-byte reserved (Reserved), 2-byte next list offset (Next List Offset), 1-byte audio control byte (Audio Control Byte) and 3-byte reserved (Reserved), totalling eight bytes.

TABLE 18

| Control List Header | 1 byte |
|---|---|
| Reserved | 1 byte |
| Next List Offset | 2 bytes |
| Audio Control Byte | 1 byte |
| Reserved | 3 bytes |

The audio control bytes are as shown for example in Table 19. That is, $00 to $07 are used as a set stream ID (Set Stream ID), $08 to $FC are undefined and $FD, $FE and $FF specify enable (Enable), disable (Disable) and keep current (Keep Current), respectively.

TABLE 19

| 0-7 | Set Stream ID |
|---|---|
| 8-$FC | Reserved |
| $FD | Enable |
| $FE | Disable |
| $FF | Keep Current |

The set steam ID list (Set Stream ID List) is made up of a 1-byte set stream ID list header (Set Stream ID List Header, $80), a 1-byte variable ID (Variable ID) and a 2-byte next list offset (Next List Offset), totalling 4 bytes.

TABLE 20

| | |
|---|---|
| Set Stream ID List Header | 1 byte |
| Variable ID | 1 byte |
| Next List Offset | 2 bytes |

The Enable List Stream ID List? designates the type of the language and consists of a 1-byte enable stream ID list header (Enable Stream ID List Header, $90), a 1-byte of reserved (Reserved), a 2-byte next list offset (Next List Offset) and a 2-byte enable map (Enable Map), totalling 6 bytes, as shown for example in Table 21.

TABLE 21

| | |
|---|---|
| Enable Stream ID List Header | 1 byte |
| Reserved | 1 byte |
| Next List Offset | 2 bytes |
| Enable Map (Audio Control Byte) | 2 bytes |

In addition, when the application is carried out over plural optical discs, it is possible for the play sequence descriptor PSD to contain a change volume list or a change volume list type 2 shown below.

The change volume list (Change Volume List) CL is list for effecting optical disc exchange for application over plural optical discs.

The change volume list (Change Volume List) is as shown in Table 12.

TABLE 22

| | |
|---|---|
| Change Volume List Header | 1 byte |
| Reserved | 1 byte |
| Cancel List Offset | 2 bytes |
| Disc ID | 8 bytes |
| List ID of Next Disc | 2 bytes |
| Error Item Offset | 2 bytes |
| Return List Offset | 2 bytes |
| Cancel Region | 4 bytes |

If the return list offset is not 0, there is the following list shown in Table 13.

TABLE 23

| | |
|---|---|
| Number of Item: NOI | 1 byte |
| Wait Time | 1 byte |
| From Play Item #1 ID to Play Item #NOI ID | 2 bytes each |

The change volume list type 2 is a list for effecting optical disc exchange for an application over plural optical discs. The change volume list has been extended so that control may be effected for a CD title other than the video CD. The list is followed by description of the play item PI for an exchanged optical disc.

The construction of the change volume list type 2 is as shown in Table 24.

TABLE 24

| | |
|---|---|
| Change Volume List 2 Header | 1 byte |
| List Mode | 1 byte |
| Disc ID | 8 bytes |
| Cancel List Offset | 2 bytes |
| List ID of Next Disc | 2 bytes |
| Error Item Offset | 2 bytes |
| Return List Offset | 2 bytes |

TABLE 24-continued

| | |
|---|---|
| Number of Item: NOI | 1 byte |
| Wait Time | 1 byte |
| From Play Item #1 Offset To Play Item #End Offset | 2 bytes each |

The play item is followed by a play item PI of a destination of the exchanged optical disc.

The required key functions include next, previous, skip, cancel, fast feed (FF) and rewind (FOR).

The No Operation List NOL consists of a 1-byte No Operation List Header, such as $FE, a 1-byte Clear Flag, a 2-byte List ID Number, a 2-byte List ID offset, totalling 6 bytes, as shown for example in Table 25. The Clear Flag is used only for the Change Volume for List. For the Clear Flag of 1 and 0, all variables are set to 0 and variables are not changed, respectively.

TABLE 25

| | |
|---|---|
| No Operation List Header | 1 byte |
| Clear Flag | 1 byte |
| List ID Number | 2 bytes |
| Next List Offset | 2 bytes |

Among the above variables, there are variables for user and those for the system. The variables for user comprise 32 16-bit integer variables in 2's complement representation (ID=0 to 31) that can be read and written and are reset to 0 at the time of reproduction. However, the by the change volume list, the variables are not cleared when the optical disc is exchanged. That is, if the variables are desired to be cleared, then No operation List, having the clear flag set to 1, is recorded at a pre-set list ID of the targeted optical disc.

The variables for the system are read-only 16 bit data and are comprised of, for example, variables for errors for results of calculations, variables for default language display and variables for audio elementary state display, as shown for example in Tables 26 to 29.

TABLE 26

| | |
|---|---|
| bit[0] | Carry |
| bit[1] | Overflow |
| bits[15–2] | Reserved |

TABLE 27

| | |
|---|---|
| bit [0–12] | Reserved |
| bit [13] | for Multi-Stream |
| bits[15, 14] | 00: NTSC |
| | 01: PAL |
| | 1x: Reserved |

TABLE 28

| | |
|---|---|
| bit[8–15]($FC) | First Character of ISO 639 Part 2 Language Code |
| bit[0–7]($FC) | Second Character of ISO 639 Part 2 Language Code |
| bit[8–15]($FC) | Third Character of ISO 639 Part 2 Language Code |
| bit[0–7]($FC) | Reserved |

TABLE 29

| bit[0–3] | Stream ID |
|---|---|
| bit[4–13] | Reserved |
| bit[15] | 0: Disable |
|  | 1: Enable |

Finally, the end list EL is a list to which processing is transferred after end of the sequence. The construction of the end list is as shown in Table 30.

TABLE 30

| End List Header | 1 byte |
|---|---|
| Reserved | 7 bytes |

The end list header (End List Header) employing $FF specifies the end list.

Figure 9:
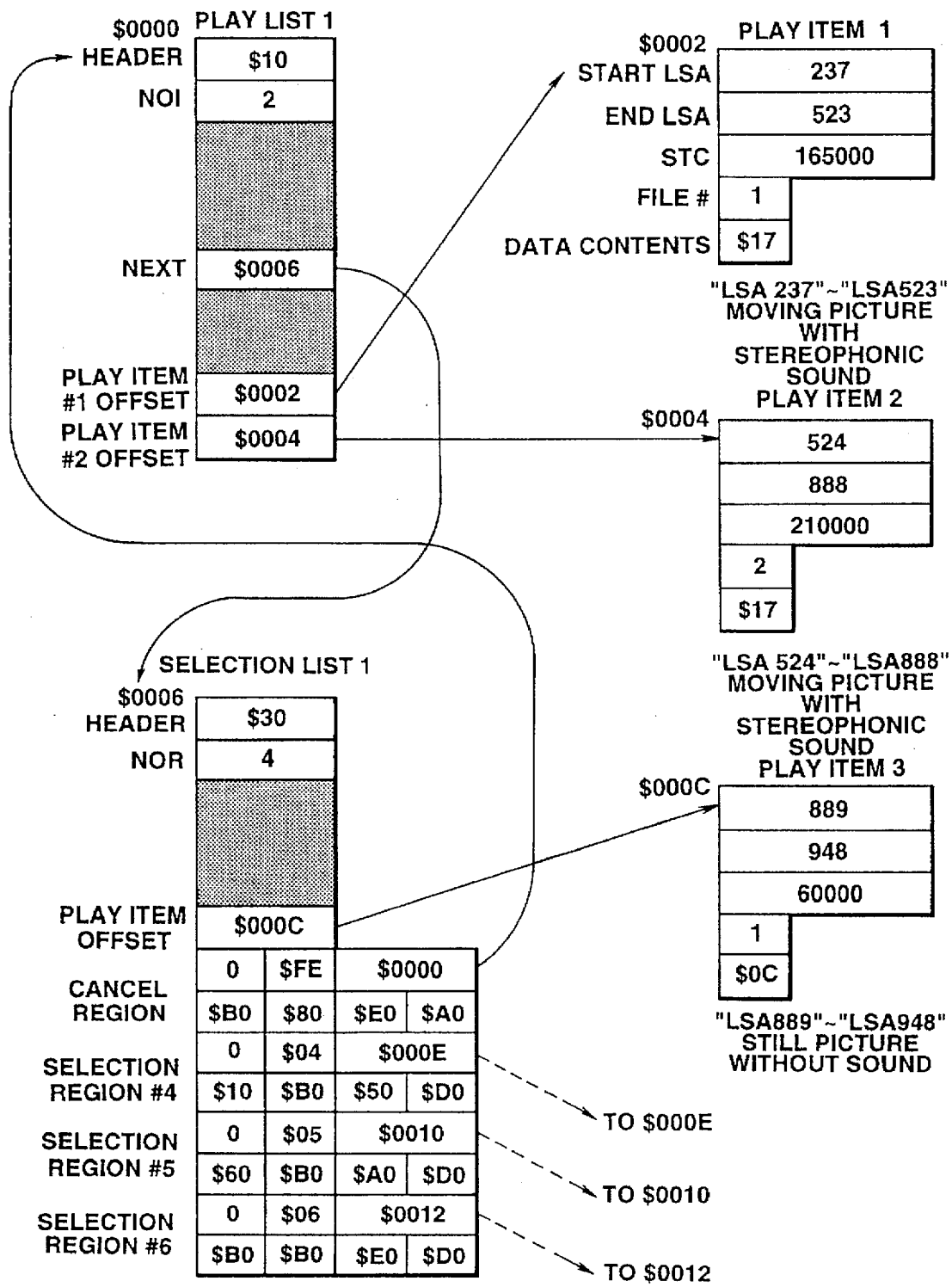
FIG. 9 shows an example of the data linking relation in a play sequence descriptor in an information recording medium according to the present invention.
Figure 10:
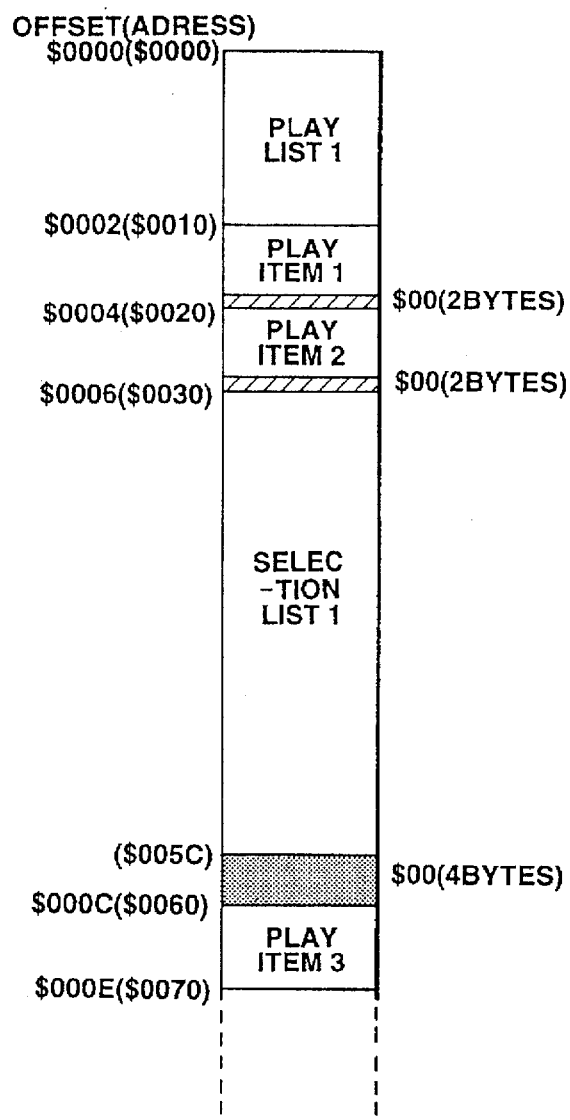
FIG. 10 illustrates the layout when the play sequence descriptor of the information recording medium according to the present invention is stored in a memory.

Referring to FIGS. 9 and 10, an example of the construction of the play sequence descriptor PSD is explained. FIGS. 9 and 10 show the relation of interconnection of the play list PL, play item PI and the selection list SL and the layout when storing the play sequence descriptor PSD in e.g. the RAM 6 of FIG. 2, respectively. Meanwhile, FIG. 9 only shows a portion of data in the play list PL and in the selection list SL for simplicity.

The play list PL1 of FIG. 9 states $10 as explained above. The number of play item NOI states 2 thus showing that two play items PI are stated in the play list PL1. The next list offset states $0006 showing that a list (selection list SL1 in FIG. 9) to which processing is transferred when reproduction of the total items in the play list PL1 has come to a close or when the next function has been selected by the user and there is no remaining item to be reproduced is stored in a memory at an offset of $0006 from the leading end of the play sequence descriptor PSD, as shown in FIG. 10. The play item #1 offset states $0002, showing that, when the play item PI1 concerning the item 1 is stored in the memory, it is stored at an offset of $0002 from the leading end of the play sequence descriptor PSD, as shown in FIG. 10. The play item #2 offset states $0004, showing that, when the play item PI2 concerning the item 2 is stored in the memory, it is stored at an offset of $0004 from the leading end of the play sequence descriptor PSD, as shown in FIG. 10.

In the play item PI1 concerning the item 1, "237", "523", "165000", "1" and $17 are stated as the start LSA, end LSA, stop system time clock STC, file number and data contents, respectively. Thus it is seen that, for reproducing the item 1, it suffices to read the sector specified by "LSA 523" from "LSA 237" on the optical disc, while it is seen from the data contents that the contents of the item 1 are moving pictures having stereo speech. In the play item PI2 concerning the item 2, "542", "888", "2", "210000" and $17 are stated as the start LSA, end LSA, file number, stop system time clock STC, and data contents, respectively. Thus it is seen that, for reproducing the item 2, it suffices to read the sector specified by "LSA 888" from "LSA 524" on the optical disc, while it is seen from the data contents that the contents of the item 2 are moving pictures having stereo speech.

Meanwhile, since the play items PI1 and PI2 are substantially data belonging to the play list PL1, the play list PL1 and the play items PI1 and PI2 together may be regarded as being a sole play list PL.

In the selection list SL1 of FIG. 9, there is stored $30 as the selection list header, as stated above. The number of regions NOR stores 4, meaning that four regions are stated by the selection list SL, that is that, if a pointing device such as a mouse is employed, four numerical values may be entered by indicating four different regions. The selection table offset states $000C, showing that, when the play item PI3 concerning the item 3 is stored in the memory, it is stored at an offset of $000C from the leading end of the play sequence descriptor PSD, as shown in FIG. 10. In the cancel region, there are stated $B0, $80, $50 and $A0, whereas, in the selection region #4, there are recorded $10, $B0, $50 and $D0. In the selection region #5, there are stated $60, $B0, $A0 and $D0. In the selection region #6, there are recorded $B0, $B0, #E0 and $D0. Thus the coordinates corresponding to the three regions are specified. In the selection list SL1 are stated four selection #n offsets, indicating that the lists of the corresponding numbers are stored at the offsets of $0000, $000E, $0010 and $0012 from the leading end of the play sequence descriptor PSD in the memory.

Also, in the play item PI3 concerning the item 3, "889", "948", "60000", 1 and $0C are stated as a start LSA, an end LSA, stop system time clock STC, file number and as data contents, respectively. Thus it is seen that, for reproducing the item 3, it suffices to read the sectors denoted by "LSA948" from "LSA948" on the optical disc, while it is seen from the data contents that the contents of the item 3 are a moving picture without a sound.

Meanwhile, since the offset is represented by 8 bytes as one unit, the portions corresponding to addresses from $005C to $0060 in FIG. 10 are stuffed with 0s on the memory as being vacant space.

Figure 11:
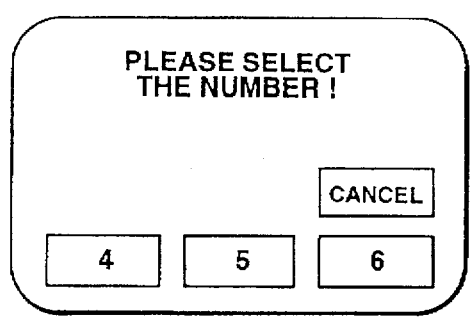
FIG. 11 illustrates an example of a menu screen.

FIG. 11 shows a display screen when the item 3 is reproduced. The item 3 is a menu picture for selection by the user using the menu. If the user moves a cursor, not shown, to a position 4 on the display screen using a mouse, and clicks at the position, this is tantamount to indicating an area defined by the selection region #4, thus indicating the selection #4 offset of the selection table 1 corresponding to the region. The offset $000E of the list of the corresponding number can be known from the contents of the selection #4 offset, so that selection may be made of the list corresponding to 4 on the display screen.

Figure 8:
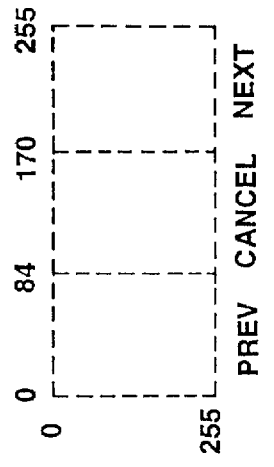
FIG. 8 illustrates a predetermined fixed region of a play list PL of the information recording medium according to the present invention.
Figure 12:
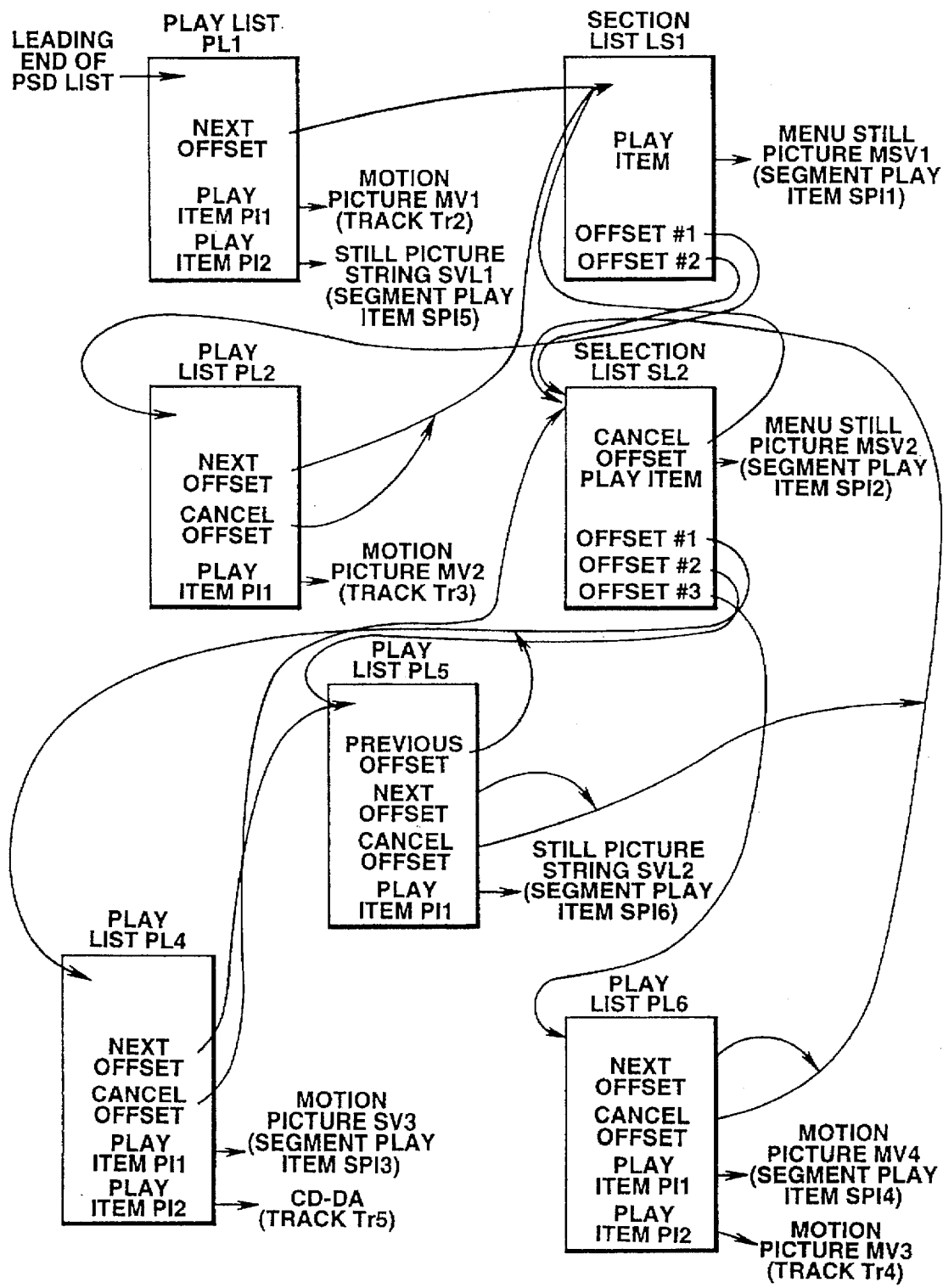
FIG. 12 illustrates an operational example of a playback control (play sequence controller) of an information reproducing apparatus according to the present invention.

The above-described playback control is explained by referring to FIGS. 12 and 1. FIG. 8 shows an embodiment different from FIGS. 18 and 19 and thus shows an example in which five play lists PL and two selection lists SL have been stored in the playback sequence descriptor PSD. In the present embodiment, the play item PI is stated as being a part of the associated play list PL or the selection list SL, while the selection table is stated as being a part of the associated selection list SL.

When the optical disc of the present embodiment (video CD) is loaded on a CD deck 1 shown in FIG. 2, the playback mode employing playback control is automatically entered (automatic playback mode) so that the list starts to be interpreted from an item corresponding to the initial play item PL1 disposed at the leading end of the play sequence descriptor PSD shown in FIG. 12. In the play list PL, playback is started sequentially from an item corresponding to the first play item PI. Thus, in the play list PL1, the play item PI1 is first designated so that, for example, the moving picture MV1 of track Tr2 of FIG. 1 starts to be reproduced. The play item PI2 is then designated and the still picture train SVL1 of the segment play item SP15 of FIG. 1 starts to be reproduced. If there is no request by the user, the moving picture MV1 and the still picture train SVL1 are sequentially designated in the play list PL1. However, the play items PI1 and PI2 may be selected depending on the user's request so that the reproduced item will be switched responsive to such request. For example, if the user selects the next key provided on the switch 11 or the remote controller 9 in FIG. 2 during reproduction of the moving picture MV1, the reproduced item is switched to the still picture train SVL1. If the user selects the previous key provided on the switch 11 or the remote controller 9 in FIG. 2 during reproduction of the still picture train SVL1, the reproduced item is switched to the moving picture MV1. If, with the play list PL1, the user selects the next key during reproduction of the still picture train SVL1, or the reproduction of the moving picture MV1 and the still picture train SVL1 comes to a close, transfer occurs to interpretation of the selection list SL1 of FIG. 12 based on the next list offset.

On transferring to the selection list SL1, the item designated on the play item offset is designated and the menu still picture MSV1 of the segment play item SPI1 of FIG. 1 is automatically reproduced. It is now possible for the user to select the list desired to be transferred to next using the number displayed on the menu still picture MSV1. If, in the menu still picture MSV1 of the selection list SL1, the user enters the number 1, using the number input key provided on the switch 11 or the remote controller 9 of FIG. 2, the selection #1 offset is designated to proceed to interpretation of the play list PL2. If the user enters the number 2, the selection #2 offset is designated to transfer to interpretation of the selection list SL2.

In the play list PL2, the play item PI1 is designated and the moving picture MV2 of track Tr3 of FIG. 1 is automatically reproduced. If, in the play list PL2, the user selects the switch 11 of FIG. 2 or the next key provided on the remote controller 9, interpretation of the list corresponding to the next list offset is entered. If the user selects the cancel key provided on the remote controller 9 or switch 11 provided on the remote controller 9, interpretation of the list corresponding to cancel list offset is entered. However, the same offset value is described in the next list offset and the cancel list offset of the play list PL2 of the present embodiment. Whichever of these is selected, the selection list SL1 is re-entered. When the reproduction of the moving picture MV2 comes to a close, reversion is made to the selection list SL1 based upon the next list offset.

In the selection list SL2, the item stated on the play item offset is designated and the menu still picture MSV2 of the segment play item SPI2 of FIG. 1 is produced. If the user selects the cancel key, reversion is made to the selection list SL1 based upon the cancel list offset. Conversely, if the number 1 displayed on the menu still picture MSV2, the selection #1 offset is selected and the play list PL4 is entered. If the number 2 is entered, the selection #2 offset is selected and the play list PL5 is entered. If the number 3 is entered, the selection #3 offset is selected and the play list PL6 is entered.

In the play list PL4, the play item PI1 is first designated and the still picture SV3 of the segment play item SP13 of FIG. 1 is reproduced. The play item PI2 is then designated to reproduce the CD-DA of the track Tr5 of FIG. 1. If, in the play list PL4, the user selects the next key during reproduction of CD-DA or the reproduction of the still picture SV3 or the CD-DA comes to a close, the play list PL5 is entered based upon the next list offset. If the user selects the cancel key, reversion is made to the selection list SL2 based upon the cancel list offset.

In the play list PL5, the play item PI1 is designated and the still picture train SVL2 of the segment play item SP16 of FIG. 1 is reproduced. If the user selects the previous key, reversion is made to the play list PL4 based upon the previous list offset. If, in the play list PL5, the user selects the next key, reversion is made to the selection list SL2 based upon the next list offset. If the user selects the cancel key, reversion is made to the selection list SL2 based upon the cancel list offset. That is, the next list offset and the cancel list offset of the play list PL5 are of an equal offset value. Also, when the reproduction of the still picture train SLV2 comes to a close, the next list offset is designated, and reversion is made to the selection list SL2.

In the play list PL6, the play list PI1 is selected and the moving picture MV4 of the segment play item SPI4 of FIG. 1 is reproduced. The play item PI2 is then designated and the moving picture MV3 of the track Tr4 of FIG. 1 is reproduced. If, in the play list PL6, the user selects the next key, reversion is made to the selection list SL2 based upon the next list offset. Also, when the reproduction of the moving pictures MV4 and MV3 comes to a close, the next list offset is designated, and reversion is made to the selection list SL2. If the user selects the cancel key, reversion is made to the selection list SLZ based upon the cancel list offset. The next list offset and the cancel list offset of the play list PL6 are of an equal offset value.

Figure 13:
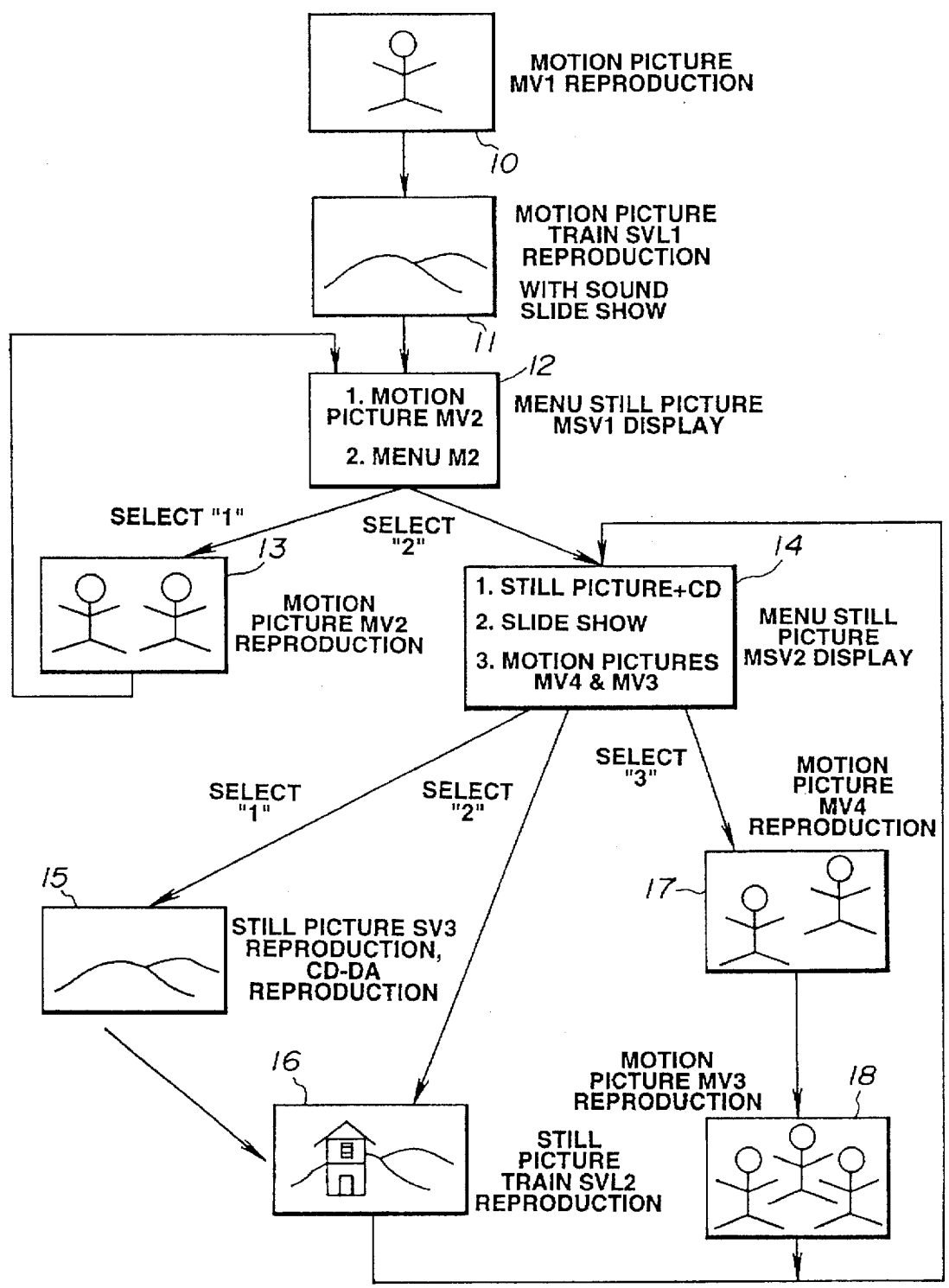
FIG. 13 illustrates an exemplary operation of a playback control (play sequence descriptor) of the present embodiment taking an example of an actual screen.

A more specific example of the playback control function in FIGS. 8 and 1 is explained by referring to FIG. 13.

FIG. 13 shows a display screen of a display device, not shown, connected via a terminal 26 of FIG. 2. The display device may be a monitor display employing a liquid crystal display or a CRT. FIG. 13 shows an example in which several menu still pictures are provided in the segment play item SPI of the track Tr1 of FIG. 1 and simple branch reproduction is enabled in combination with the moving pictures pursuant to MPEG downstream of the track Tr2.

It is assumed that, as shown in FIG. 13, a playback picture 10 of the moving picture MV1 is displayed (reproduced) on the monitor display when the play item PI1 is designated in the play list PL1 of FIG. 12. By the play item PI2 thus designated, the playback picture 11 of a slide show with the sound is displayed on the monitor display as the still picture train SVL1.

When the user selects the next list offset, or the slide show comes to a close and the next list offset is designated, the selection list SL1 of FIG. 12 is entered and the playback picture 12 of the menu still picture MSV1 is displayed on the monitor display.

If "1" corresponding to the offset #1 in the selection list SL1 of FIG. 12 is selected, the play list PL1 of FIG. 12 is entered, and the play item PI1 in the play list PL2 is designated so that the playback picture 13 of the moving picture MV2 is displayed on the monitor display. When the next list offset or the cancel list offset is selected, the display picture on the monitor display is returned to the playback picture 12. If the reproduction of the moving picture MV2 comes to a close, the next list offset is designated so that the display picture is returned to the playback picture.

If "2" corresponding to the offset #2 in the selection list SL1 is selected, transfer is made to the selection list SL2 of FIG. 12. In this selection list SL2, the playback picture 14 of the menu still picture SV2 is displayed on the monitor display.

If "1" corresponding to the offset #1 of the selection list SL2 of FIG. 12 is selected, transfer occurs to the play list PL4 of FIG. 12. In this play list PL4, the play item PI1 is designated so that the playback picture 15 of the still picture SV3 is displayed on the monitor display (display of one still picture) or the play item PI2 is designated for reproducing the CD-DA (audio of CD).

When the user selects the next list offset in the play list PL4, or the reproduction of the still picture SV3 or CD-DA comes to a close, transfer occurs to the play list PL5 of FIG.

12 by the next list offset. Thus the play item PI1 is designated at the play list PL5 so that, for example, the slide show is displayed on a monitor display as the playback picture 16 of the still picture string SVL2.

The play list PL5 may also be entered by selecting "2" corresponding to the offset #2 in the selection list SL2 of FIG. 12 in the state of the playback picture 14 of the menu still picture MSV2. At this time, the play item PI1 is designated in the play list PL5, so that similarly the slide show is displayed on the monitor display as a playback picture 16 of the still picture train SVL2.

If, in the play list PL5, the next list offset or the cancel list offset is selected, the display picture on the monitor display reverts to the playback picture 14 of the menu still picture MSV2. The next list offset is also designated when the reproduction of the still picture train SVL2 is designated to revert to the playback picture 14.

If, in the state of the playback picture 14 of the menu still picture MSV2, "3" corresponding to the offset #3 in the selection list SL2 of FIG. 8 is selected, the play list PL6 of FIG. 8 is entered. In the play list PL6, the play item PI1 is designated for displaying the display picture 17 of the moving picture MV4, or the play item PI2 is designated for displaying the playback picture 18 of the moving picture MV3 on the monitor display.

In the play list PL6, the display picture on the monitor display reverts to the playback picture 14 of the menu still picture MSV2 if the next list offset or the cancel list offset is selected. If the playback of the moving pictures MV3 and MV4 comes to a close, the next list offset is designated to revert to the playback picture 14.

Figure 14:
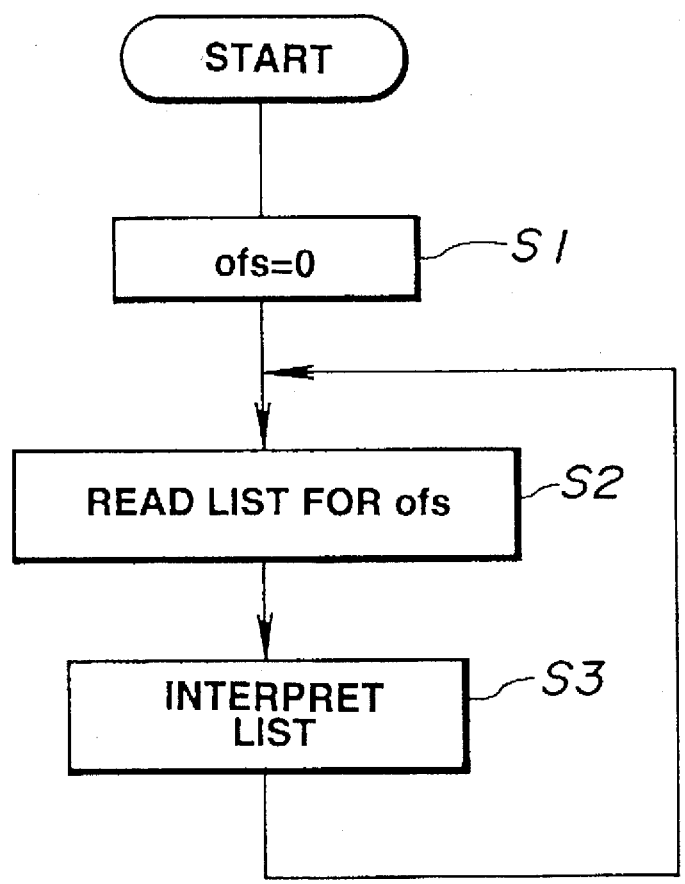
FIG. 14 is a flow chart showing the processing flow for offset initialization and reading of an offset list.

The process flow of the CPU 4 in the playback control function is explained by referring to each flow chart of FIGS. 14 ff.

FIG. 4 is a flow chart on the offset (ofs). In this figure, the offset is initialized at step S1 to offset (ofs)=0. At step S2, the list associated with the initialized offset, the offset is set with execution of the lists as later explained, and the offset corresponding to the offsets designated via the list ID offset table LOT, are read. At step S3, the list is interpreted and executed.

Figure 15:
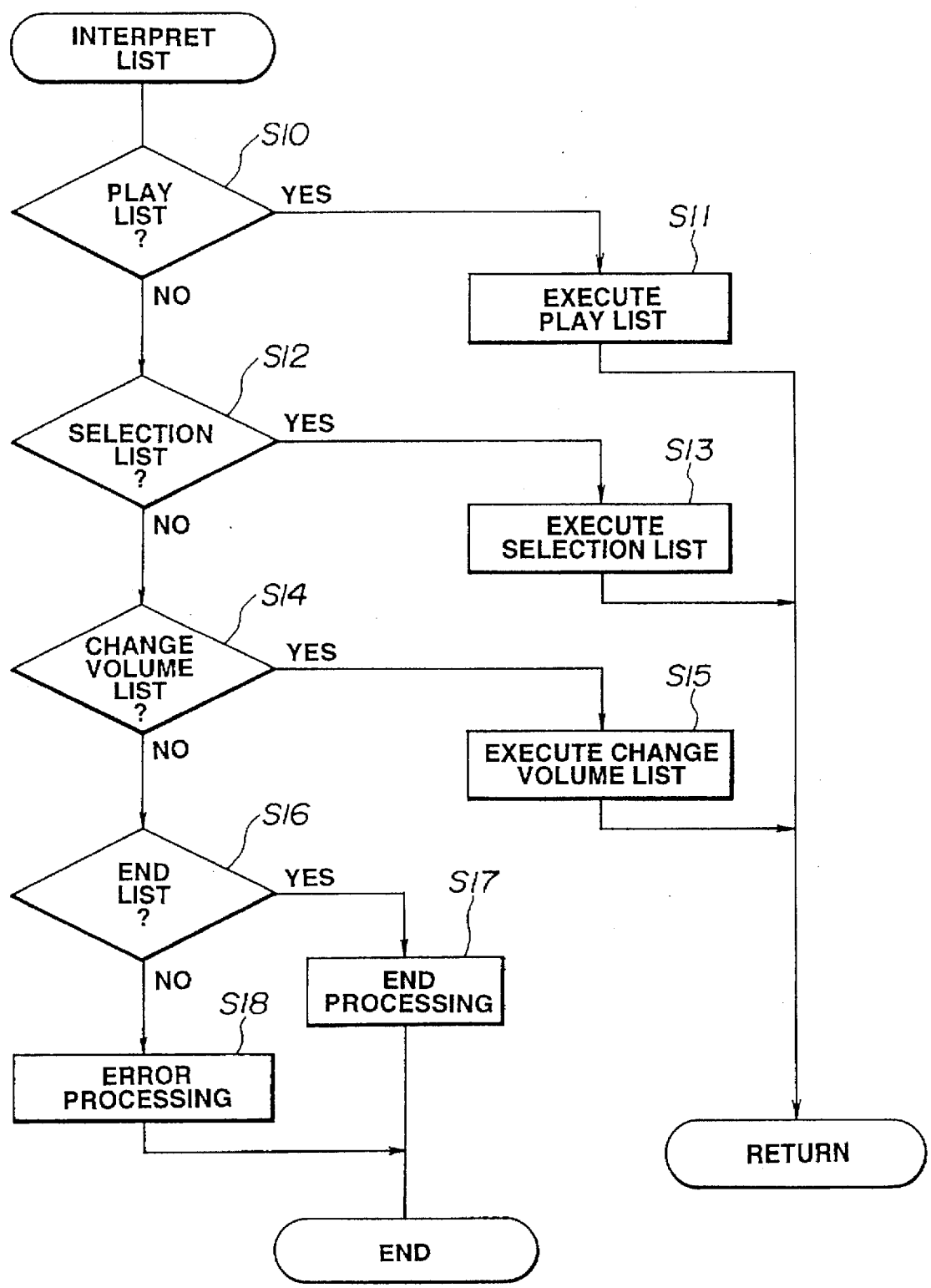
FIG. 15 is a flow chart showing the processing flow of list interpretation and execution.

FIG. 15 is a flow chart on interpretation and execution of the list.

At step S10 of FIG. 15, it is judged whether or not the play list PL has been selected or executed. If the result of decision at step S10 is YES, the program transfers to execution of the play list PL of step S11 after which program return is made. If the result of decision at step S10 is NO, the program transfers to step S12.

At step S12, it is judged whether or not the selection list SL has been selected or designated. If the result of decision at step S12 is YES, the program transfers to execution of the selection list SL at step S13 before program return. If the result of decision at step S12 is NO, the processing transfers to step S14.

At step S14, it is determined whether or not the change volume list has been selected or designated. If the result of decision at step S14 is YES, the processing transfers to execution of the change volume list at step S15 before program return. If the result of decision at step S14 is NO, the processing transfers to step S16.

At step S16, it is determined whether or not the change volume list 2 has been selected or designated. If the result of decision at step S16 is yes, the processing is ended at step S17. If the result of the decision at step S16 is NO, the processing transfers to step S18.

At step S18, error execution processing is carried out before processing comes to a close.

Figure 16:
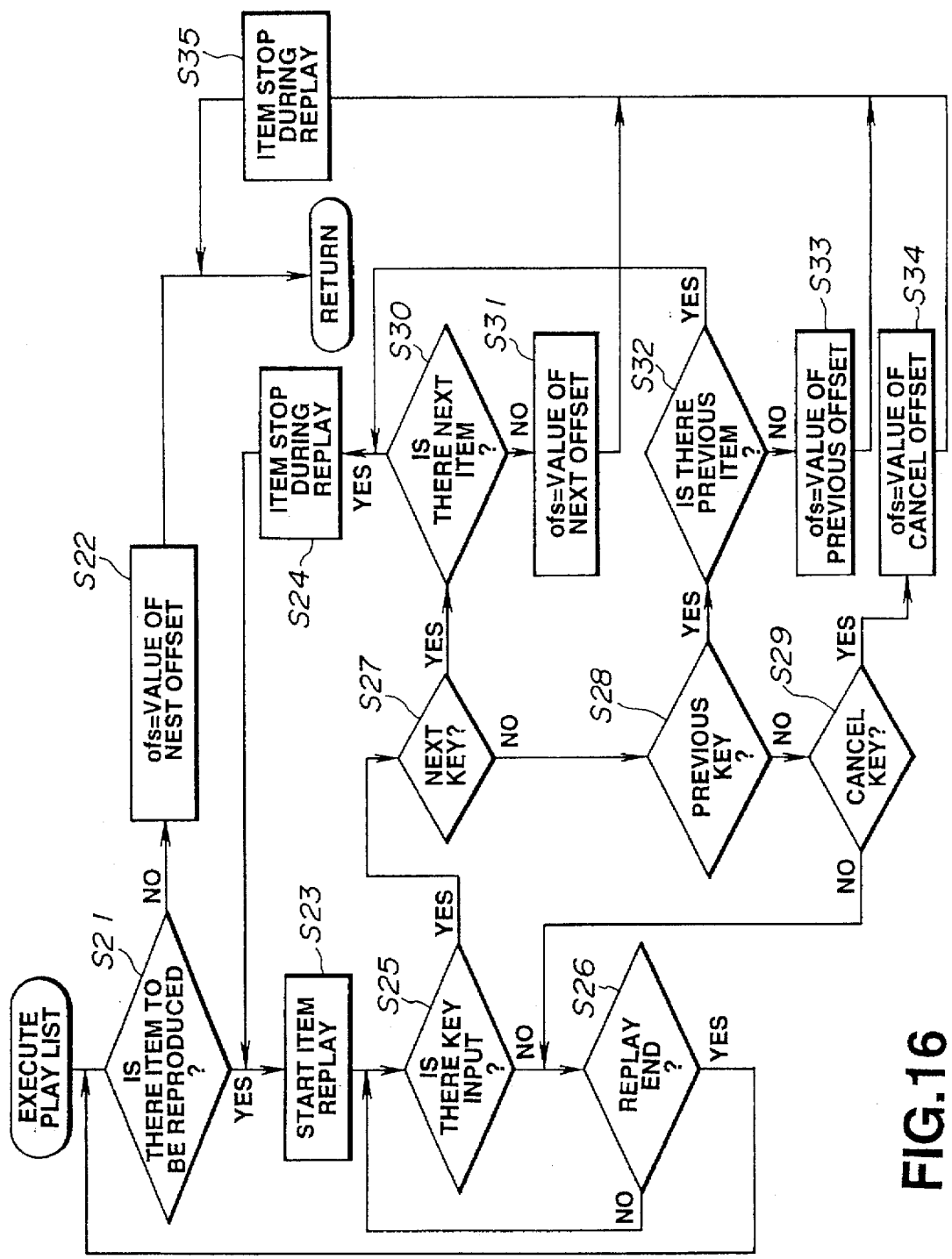
FIG. 16 is a flow chart showing the processing flow of play list execution.

FIG. 16 is a flow chart for execution of the play list PL.

In FIG. 16, it is first determined whether or not there is any item to be reproduced, that is if there is any item yet to be reproduced. If the result of judgment at step S21 is NO, offset is set to next list offset (offset=next list offset) at step S22. If the result of decision at step S21 is YES, the processing transfers to step S23.

At step S23, the item starts to be reproduced before proceeding to step S25.

At step S25, it is determined whether or not the key input by the user has been made. If the result of decision at step S25 is NO, the processing transfers to step S26 where it is determined whether or not the reproduction has come to an end. If the result of decision at step S26 is YES, the processing reverts to step S21. If the result of decision is NO, the processing reverts to step S25. If the result of decision at step S25 is YES, the processing transfers to step S27.

At step S27, it is judged whether or not the next key has been entered. If the result of decision at step S27 is NO, the processing transfers to step S28 and, if otherwise, the processing transfers to step S30.

At step S28, it is judged whether or not the previous key has been entered. If the result of decision at step S28 is YES, the processing transfers to step S32 and, if otherwise, the processing transfers to step S29.

At step S29, it is judged whether or not the cancel key has been entered. If the result of decision at step S29 is NO, the processing transfers to step S26. If the result of decision at step S29 is YES, offset is set at step S34 to cancel list offset (offset=cancel list offset) before processing transfers to step S35 where the item being reproduced is halted. After step S35, program return is made. The function similar to that of the cancel key may be afforded to a return key.

After the decision of YES at step S27, it is judged at step S30 whether or not there is any next item. If the result of decision at step S30 is YES, processing transfers to step S24 where the item being reproduced is halted before the processing reverts to step S23. If the result of decision at step S30 is NO, the processing transfers to step S31 where the offset is set to next list offset (offset=next list offset) before processing transfers to step S35.

After the decision of YES at step S28, it is judged at step S32 whether or not there is any previous item. If the result of decision at step S32 is YES, processing transfers to step S24. If the result of decision at step S32 is NO, the processing transfers to step S33 where the offset is set to previous list offset (offset=previous list offset) before processing transfers to step S35.

Figure 17:
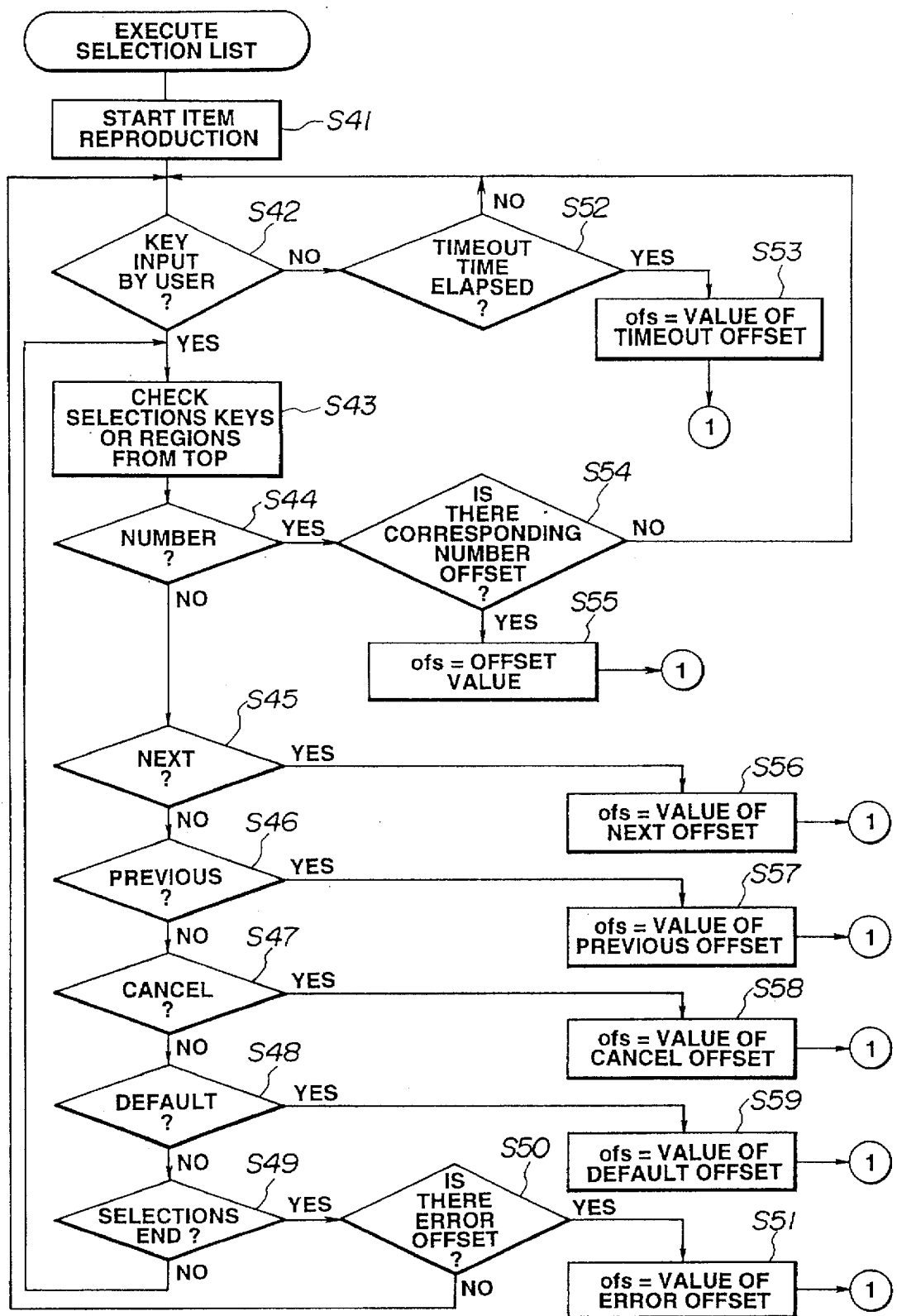
FIG. 17 is a flow chart showing the processing flow of selection list execution.

FIG. 17 is a flow chart for executing the selection list SL.

In FIG. 17, the item starts to be reproduced at step S41. At step S42, it is judged whether or not a key input by the user has been made. If the result of decision at step S42 is NO, processing transfers to step S52 and, if otherwise, to step S43.

At step S43, it is judged whether or not the key or the region has been entered in the sequence of the #number of the selections. Processing then transfers to step S44.

At step S44, it is judged whether or not the numerical key input or the numerical region input has been made. If the result of decision at step S44 is YES, processing transfers to step S54 and, if otherwise, processing transfers to step S45.

At step S45, it is judged whether or not the next key or next region has been entered. If the result of decision at step S45 is YES, processing transfers to step S56. At step S56, offset is set to next list offset (offset=next list offset). Processing then transfers to processing of FIG. 18 as later explained. If the result of decision at step S45 is NO, processing transfers to step S46.

At step S46, it is judged whether or not the previous key previous region has been entered. If the result of decision at step S46 is YES, processing transfers to step S57. At step S57, offset is set to previous list offset (offset=previous list offset). The processing then transfers to that of FIG. 18 as later explained. If the result at step S46 is NO, processing transfers to step S47.

At step S47, it is judged whether the cancel key or the cancel region has been entered. If the result of decision at step S47 is YES, processing transfers to step S58. At step S58, offset is set to cancel list offset (offset=cancel list offset). The processing then transfers to that of FIG. 18 as later explained. If the result of decision at step S47 is NO, the processing transfers to step S48.

At step S48, it is judged whether or not there is a default. If the result of judgment at step S48 is YES, processing transfers to step S59. At step S59, offset is set to default list offset (offset=default list offset) before processing transfers to FIG. 18 as later explained. If the result of decision at step S48 is NO, processing transfers to step S49.

At step S49, it is judged if selections have come to a close. If the result of judgment at step S49 is YES, processing transfers to step S50 and, if otherwise, processing is returned to step S43.

At step S50, it is judged whether or not there is an error offset. If the result of judgment at step S50 is YES, processing transfers to step S51 where offset is set to error list offset (offset=error list offset) before processing transfers to that of FIG. 18 as later explained. If the result of judgment at step S50 is NO, processing reverts to step S42.

At step S52, to which processing proceeds if the result of judgment at step S42 is NO, it is judged whether a pre-set time as measured by time measurement unit has elapsed (time-out). If the result of judgment at step S52 is NO, processing transfers to S42 and, if otherwise, to step S53. At step S53, offset is set to timeout list offset before processing transfers to that of FIG. 18 as later explained.

At step S54, to which processing proceeds if the result of judgment at step S44 is YES, it is judged whether or not there is an offset of the corresponding number. If the result of judgment at step S54 is NO, processing reverts to S42 and, if otherwise, to step S55. At step S55, offset is set to the offset value before processing transfers to that of FIG. 18 now explained.

Figure 18:
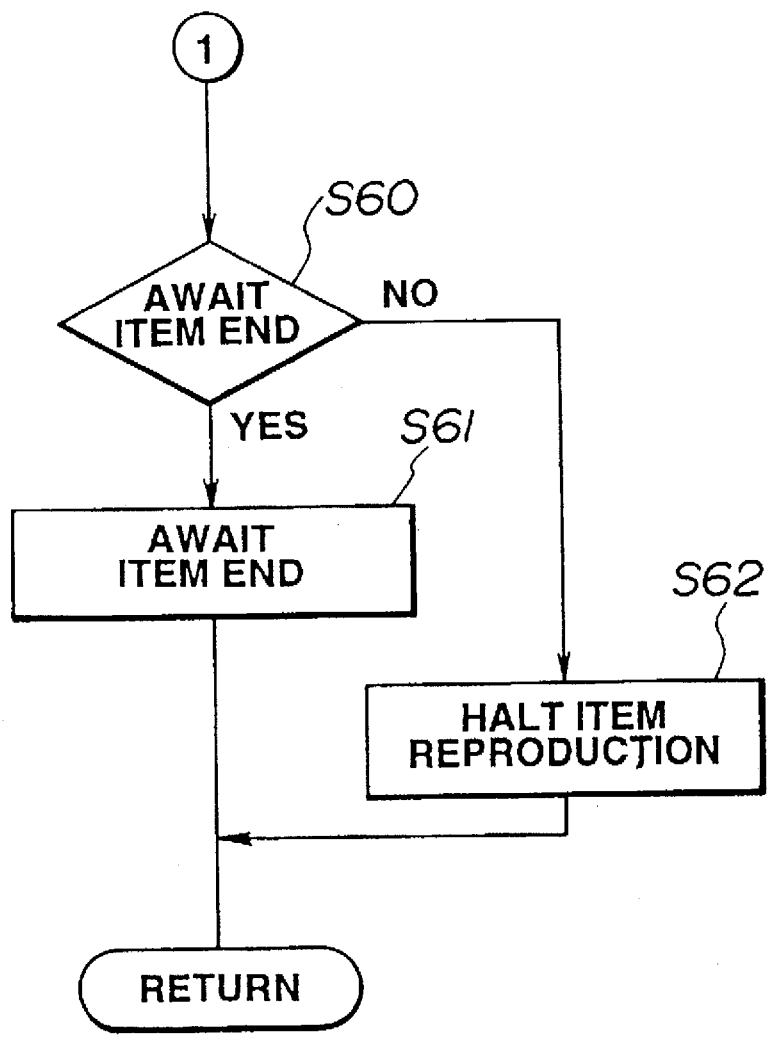
FIG. 18 is a flow chart showing a portion of a flow chart showing the processing flow of selection list execution.

In the flowchart of FIG. 18, it is first judged at step S60 whether or not item end is to be waited for. If the result of judgment at step S60 is YES, item end is waited for at step S61 before the program is returned. If the result of step S60 is NO, processing transfers to step S62 where item reproduction stop processing is carried out before program return.

Figure 19:
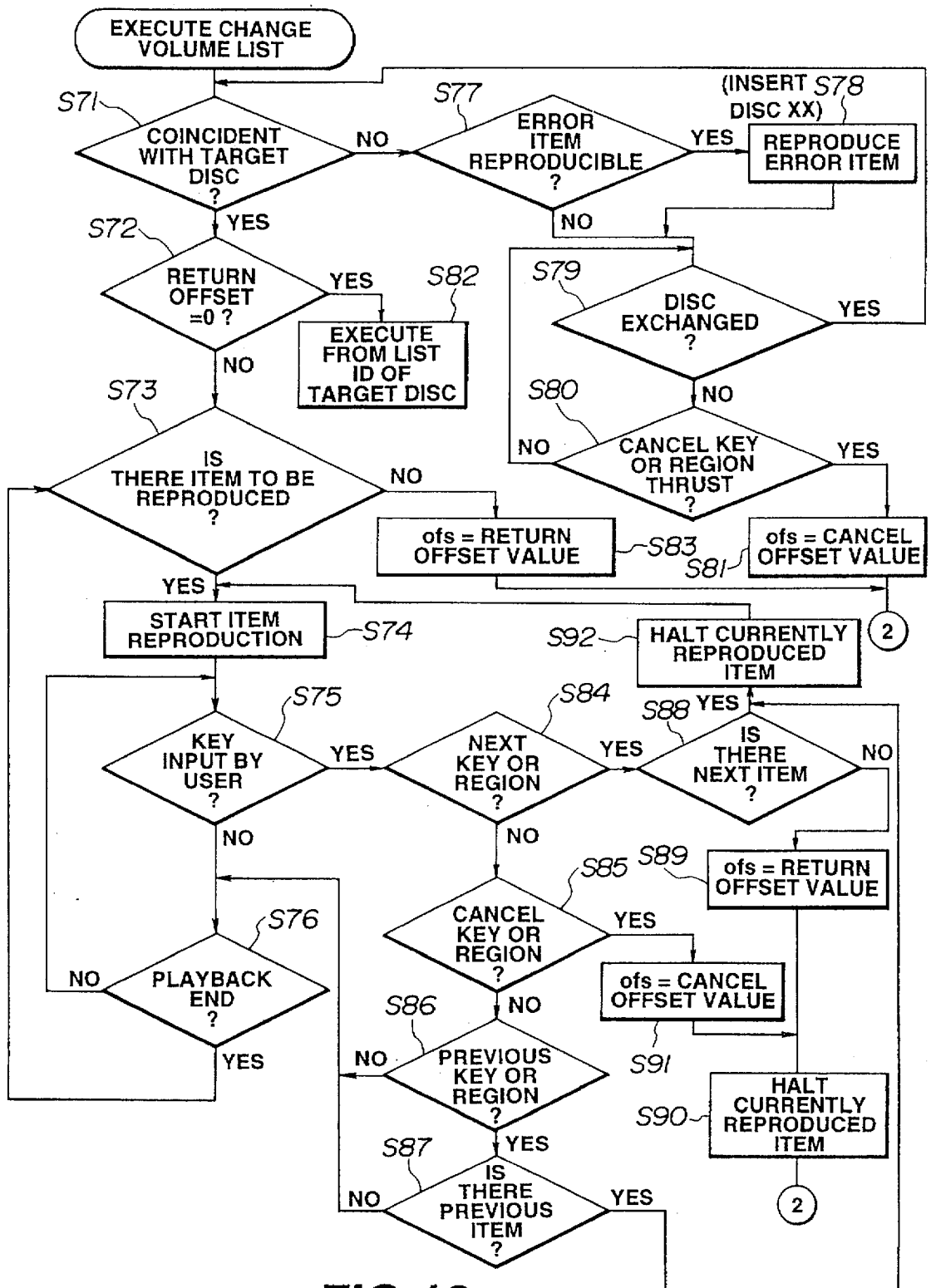
FIG. 19 is a flow chart showing the processing flow of change volume execution.

FIG. 19 shows a flowchart for execution of the change volume list and the change volume list 2.

In FIG. 19, it is judged at step S71 whether or not there is coincidence with the target disc ID. If the result of decision at step S61 is NO, processing transfers to step S77 and, if otherwise, transfers to step S72.

At step S72, it is judged whether or not the return list offset is equal to zero. If the result of decision at step S72 is YES, execution processing is carried out at step S82 from the list ID of the targeted optical disc. If the result of judgment at step S72 is NO, processing transfers to step S73. If the change volume list 2 is being executed, the processing transfers to step S73 without executing the step S72.

At step S73, it is judged whether or not there is any item to be reproduced. If the result of decision at step S73 is NO, offset is set to return list offset (offset=return list offset) at step S83 before transferring to the processing of FIG. 20. If the result of decision at step S73 is YES, processing transfers to step S74 where the item starts to be reproduced. The processing then transfers to step S75.

At step S75, it is judged whether or not there is any key input made by the user. If the result of decision at step S75 is YES, processing transfers to step S84 and, if otherwise, to step S76, where it is judged whether or not playback is to come to an end. If the result of decision at step S76 is NO, processing reverts to step S75 and, if otherwise, processing reverts to step S73. If the result of the decision at step S71 is NO, it is determined at step S77 if an error item is reproducible and, if so, a display "insert next disc" is made at step S78, the error item is reproduced, and processing transfers to step S79. If the result of the decision at step S77 is NO, processing transfers to step S79.

At step S79, it is judged whether or not an optical disc has been changed. If the result of decision is YES, processing reverts to step S71. If the result is NO, processing transfers to step S80.

At step S80, it is judged whether the cancel key or the cancel region has been entered. If the result of judgment at step S80 is NO, processing reverts to step S79 and, if otherwise, processing transfers to step S81. At step S81, the offset is set to cancel list offset (offset=cancel list offset) before transferring to the processing of FIG. 20.

If the result of decision at step S75 is YES, it is judged at step S84 whether or not the next key input or the next region input. If the result of decision at step S84 is YES, processing transfers to step S88 and, if the result is NO, transfers to step S85.

At step S85, it is judged whether or not the key input or the cancel key or cancel region has been entered. If the result of decision at step S85 is YES, processing transfers to step S91 and, if otherwise, to step S86.

At step S86, it is judged whether or not the key input is that for the previous key or the previous region. If the result of decision at step S86 is NO, processing transfers to step S76 and, if otherwise, to step S87.

At step S87, it is judged whether or not there is any previous key input or previous region input. If the result of decision at step S87 is NO, processing transfers to step S76 and, if otherwise, to step S92.

At step S92, the item being reproduced is halted before reverting to step S74.

If the result of decision at step S84 is YES, it is judged at step S88 whether or not there is any next item. If the result of decision at step S88 is YES, processing transfers to step S92 and, if otherwise, to step S89.

At step S89, the offset is set to return list offset (offset= return list offset) before processing transfers to step S90.

If the result of decision at step S85 is YES, the offset is set to cancel list offset (offset=cancel list offset) before processing transfers to step S90.

Figure 20:
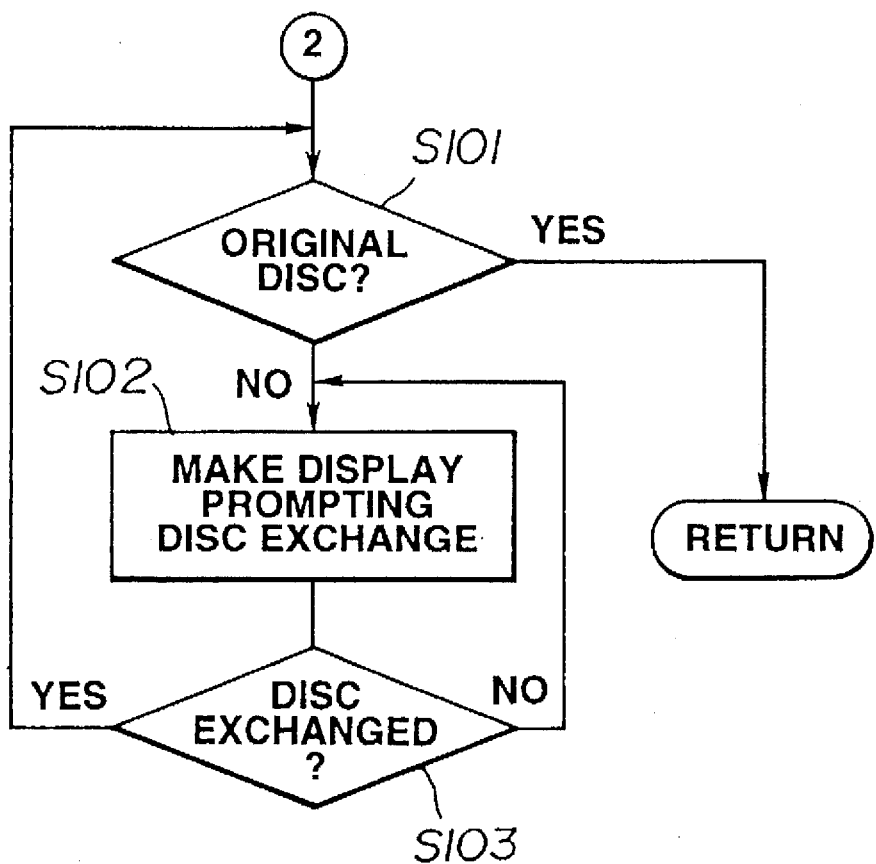
FIG. 20 is a portion of a flow chart showing the processing flow of change volume execution.

At step S90, the item being reproduced is halted, before transferring to the processing of FIG. 20.

In the flow chart of FIG. 20, it is judged at step S101 whether or not the optical disc is the original optical disc. If the result of decision at step S101 is YES, program return is made. If otherwise, processing transfers to step S102.

At step S102, display is made for prompting optical disc exchange, after which processing transfers to step S103. At step S103, it is judged whether or not the optical disc has been exchanged. If the result of decision is YES, processing reverts to step S101 and, if the result is NO, processing reverts to step S102.

Returning to FIG. 2, showing a construction of the information reproducing apparatus of the present embodiment, hardware of the information reproducing apparatus can be constituted by annexing a MPEG chip and a RAM to the CD player. A wide variety of inexpensive players may be constituted, such as a portable radio cassette player.

Referring to FIG. 2, a variety of optical discs, such as CD-DA or CD-ROM, may be loaded on the CD deck 1, such that signals recorded on the optical disc may be read by an optical pickup of the CD deck 1. The signals read out from the CD deck 1 are transmitted to a signal processing circuit 2. The signal processing circuit 2 is operated under control by a CPU 4 for transmitting servo control signals, such as focusing control signals or tracking control signals, to the CD deck responsive to the readout signals from the optical disc, and for effecting error correction of the readout signals from the optical disc.

The playback signals for the optical disc from the signal processing circuit 2 are routed to a switching circuit 15 and to a CD-ROM decoder 3. If the optical disc is of the type of the CD-ROM, such as video CD of the present embodiment, the CD-ROM decoder 3 decodes the playback signals from the optical disc in accordance with the CD-ROM format. Of the signals decoded by the CD-ROM decoder 3, a variety of disc data, including the playback control information data, is routed to the RAM 6, while the audio data and the video data are transmitted to an MPEG audio decoder 21 and to the MPEG video decoder 22, respectively.

The MPEG audio decoder 21 decodes the audio data, based upon the format of the layer 2 of MPEG 1, while the MPEG video decoder 22 decodes the video data, based upon the MPEG1 format.

The audio signals decoded by the MPEG audio decoder 21 are routed to the switching circuit 15. The switching circuit 15 causes the audio signals from the signal processing circuit 2 or the audio signals from the MPEG audio decoder 21 to be selected when the optical disc reproduced by the CD deck 1 is the usual audio CD (CD-DA) or the optical disc of the present embodiment (video CD). The switching circuit 15 also effects switching of the audio signals between left (L) and right (R) stereo channels.

The digital audio signals via the switching circuit 15 are converted by the D/A converter 16 into analog signals which are routed via a filter 17 to an echo mixing circuit 18. The echo mixing circuit 18 mixes microphone audio input signals from a terminal 19 and audio signals via the filter 17 while applying echo to the speech input signals. That is, the echo mixing circuit 18 mixes the audio signals reproduced from the optical disc and the speech input signals from the microphone and also applies echo to the speech input signal for realizing the karaoke function.

The signals from the echo-mixing circuit 18 are routed from an output terminal 20 to downstream side devices, such as an amplifier and a speaker.

On the other hand, the video information transmitted to the MPEQ video decoder 22 is decoded by the MPEG video decoder 22 and thereby turned into digital video signals which are routed to the D/A converter 23. To the video signals converted by the D/A converter 23 into analog signals is appended the character information to be displayed by a character display circuit 24 on a downstream side display device. The resulting signal is modulated by a video modulation circuit 25 so as to be transmitted at an output terminal 26 to e.g. a monitor display.

In the ROM 5 or an electrically erasable PROM (EEPROM) 7 are stored the information of various programs employed in the CPU 4 and the above character information. The CPU 4 controls various components connected via the bus using the program information and the like in order to take out the necessary information and to route the character information to the character display circuit 24.

The CPU 4 is also connected to a sub CPU 8. The sub CPU 8 is responsive to an input signal from the various switches 11 and to signals from the receiving unit 10 receiving IR signals from the remote controller 9 for judging these signals and the contents of these signals. The sub CPU 8 is also responsive to the playback control information and the contents of the above signals to give decision as to the contents of the signals, while being responsive to the signal contents and to the control information for controlling the display on a phosphor display tube 12. The sub CPU 8 is also connected to a power source 13.

A variety of keys are arranged on the switch 11 and the remote controller 9. Examples of the keys include the next key, previous key, return key, cancel key, stop key, pause key, fast feed key, fast rewind key and a number input key. With the information reproducing apparatus of the present embodiment, the user can thrust these keys while the video CD is being automatically reproduced, so that pre-set function keys may be selected during automatic playback by thrusting these keys and hence the playback state or contents of the apparatus are changed. This permits the user to effect the playback using the above-mentioned playback control function.

That is, with the information reproducing apparatus of the present embodiment, when the next key is thrust during automatic playback, the item currently reproduced is halted and a separate item is reproduced. Similarly, when the previous key is thrust during automatic playback, the item currently reproduced is halted and a separate item is reproduced. When the cancel key is thrust during automatic playback, the item currently reproduced is halted to revert to the previous menu. However, as explained with reference to FIGS. 8 and 9, the previous menu is not necessarily the directly previous item. Similarly, if the stop key is thrust, the playback control ceases to operate to return to the initial state. If the pause key is thrust, playback is paused (transiently halted). If the pause key is thrust with the moving picture, the picture is halted, that is becomes a still picture. If the fast feed key is thrust, fast rewind playback is carried out within the currently reproduced item. During the fast feed playback, the reproduced picture is displayed as a still picture.

In addition, the information reproducing apparatus of the present embodiment supports the usual track-based shuffling or the program reproducing functions for the cases in which the playback control program is not recorded on the optical disc being reproduced, the playback control program is recorded on the optical disc but is not used, and in which the optical disc is a usual CD-DA optical disc.

In the above embodiment, the play sequence descriptor PSD includes both the play list PL and the selection list SL. It is however possible to record a plurality of the selection lists SL only and to cause cyclic display of menu pictures.

As described above, not only the moving picture data, still picture data and the speech data, but also the CPU-non-dependent simple script stating the replay sequence or user selected branching (play sequence descriptor in the present embodiment) are recorded on the optical disc (video CD) of the present embodiment. Thus it is possible with the information reproducing apparatus of the present embodiment to set the replay sequence or branching for each optical disc. It is also possible with the information reproducing apparatus of the present embodiment to advance to the designated branch destination or to points ahead or behind of the point stated in the play sequence descriptor PSD.

That is, with the present embodiment, the optical disc playback control is made using a simplified script recorded on the optical disc. This script is not dependent on the CPU of the information recording apparatus. In addition, with the present embodiment, since a lumped aggregate of data such as the totality of the moving and still pictures, speech and the slide show, is treated as an item, access to the item can be easily had in the information recording apparatus. In addition, the script is controlled on the item basis and the scriptor connection is assured by a pointer, such as next or previous. On the other hand, while the script causes the execution to be branched with the aid of various pointers, and the execution branching is effected responsive to the user's operations, execution is by a pre-set sequence if the operator does not perform the operations. The pointer is represented by the offset from the leading end when the script in its entirety is arrayed virtually, while the offset is represented as a base size (e.g. 8 byte) unit instead of as a byte unit. Thus the leading position of each script follows this unit. This is located at a boundary at every eight bytes, with the vacant space being stuffed with 0s.

Also, with the present embodiment, the script and data can be recorded together on the sole optical disc and a script of a separate volume can be addressed in association with the multi-volume. In addition, execution can be transferred to the script of the separate volume in association with the multi-volume. Since the state according to the execution sequence is not maintained, execution can be started at any script. In addition, the logical ID (list ID) can be annexed to all of the scripts. By separately providing a table of the pointers to the scripts, execution from an intermediate script becomes feasible by the logical ID. The list ID is not necessarily annexed, in which case a limitation may be imposed on execution from the script. Furthermore, by inserting at a physically specified position on the optical disc an ID indicating that the optical disc is the video CD, and by collectively recording the required information, such as the script size of the number of the list IDs, the nature of the optical disc can be identified, while the required information can be taken at a time.

As described above, with the information recording medium of the present invention, since there is recorded the playback control information made up of plural lists, at least a portion of the lists including the item information indicating one or more items reproduced based upon the list and a pointer represented by the offset from the leading end of the playback control information indicating the separate connected list, it becomes possible to have an easy access to the data specified by the user when reproducing the information recording medium of the present invention.

On the other hand, since the information recording medium of the present invention has recorded thereon the information indicating the end of the playback control information, the next processing can be entered on completion of reproduction of the playback information.

In addition, since the information indicating the attributes of the playback information is recorded on the information recording medium of the present invention, playback responsive to the attributes may be achieved. Since the information concerning the table of correlation for correlating the ID codes of the respective lists with the corresponding offsets is recorded separately from the playback control information, the user can directly select an arbitrary list. On the other hand, since there is also recorded the information for exchanging and reproducing plural information recording media, the user can be apprised of the necessity for exchanging the information recording media.

Since the recorded information is the information non-dependent on the operating system or the object code of the microcomputer provided on the information reproducing apparatus for reproducing the information recording medium, there is only little hardware-related limitations.

Consequently, with the information recording medium of the present invention, data such as moving or still pictures can be recorded as data files, while there is only little limitation related with hardware for reproduction and recorded data can be accessed easily by the hardware for reproduction. In addition, the information is of a small number of sorts and simple in function and hence may be formulated easily. The information is non-dependent on the micro-computer loaded on the information reproducing apparatus and imposes little limitations on the hardware.

With the information reproducing apparatus of the present invention for reproducing an information recording medium in which the playback control information has a plurality of lists recorded thereon, at least some of the lists including the item information indicating one or a plurality of items reproduced in accordance with the lists and a pointer represented by the offset from the leading end of the playback control information indicating a separate list connected to the lists, the playback control information reproduced from the information recording medium is stored and the playback information recorded on the information recording medium is reproduced responsive to the information selected by the commands by the user for enabling reproduction of the playback information as commanded by the user.

Since a region of the alternatives for plural items are displayed on the screen of the information reproducing apparatus for selecting one of the plural items, it is possible for the user to reproduce the information of the desired information easily by selecting the region using a pointing device such as a mouse.

If, with the information reproducing apparatus of the present invention, the information indicating the attributes of the playback information is recorded on the information recording medium, playback conforming to the attributes is feasible. If the information on the table of correlation of correlating the ID codes of the lists with the corresponding offsets is recorded on the information recording medium separately from the playback control information, it becomes possible for the user to select the playback information directly responsive to the table of correlation. Also, if the information concerning exchange and reproduction of plural information recording media is recorded on the information recording medium, the user can be apprised of the necessity of exchanging the recording media.

In addition, the information non-dependent on the operating system or the object code of the micro-computer arranged on the information reproducing apparatus of the present invention is recorded on the information recording medium, and the information reproducing apparatus of the present invention can transform the information into the information correlated with the operating system and the object code of the micro-computer using the information reproduced from the information recording medium, so that it becomes possible to control the reproduction of the information recording medium.

Furthermore, since the information reproducing apparatus of the present invention has time measurement means for measuring a pre-set time interval, reproduction of the next playback information can be entered by detecting the input failure continuing for a pre-set time interval.

Consequently, the information reproducing apparatus of the present invention can be used as a data file for recording data such as pictures or speech simply by annexing a simplified structure, while data recorded on the information recording medium can be accessed easily.

If the information of the information recording medium according to the present invention is reproduced by the information reproducing apparatus according to the present invention, a region of the alternatives associated with plural items is displayed so that one item can be selected from plural items. The result is that it becomes possible for the user to designate the region of the alternatives using a pointing device such as a mouse for setting the a pre-designated alternative to a default to easily reproduce the information of the desired item.

What is claimed is:

1. An information recording medium having recorded thereon picture information and/or speech information, a plurality of items consisting of said picture information and/or the speech information, and reproduction control information comprised of a plurality of lists for controlling the reproduction of said items, wherein at least a portion of the lists includes item information specifying one or more items reproduced in accordance with the lists and pointers represented by an offset from a leading end of the reproduction control information specifying another list to be linked, and wherein at least one of the lists is a first list including the item information specifying said one or more items, a plurality of pointers associated with plural lists branched according to a user selection and a plurality of region data defining regions of alternatives for menu display of the contents of said pointers according to a priority sequence.

2. The information recording medium as claimed in claim 1 wherein said first list includes a plurality of region data defining a plurality of rectangular regions associated with a same alternative.

3. An information recording apparatus having recorded thereon picture information and/or speech information, a plurality of items consisting of said picture information and/or the speech information, and reproduction control information comprised of a plurality of lists for controlling the reproduction of said items, wherein at least a portion of the lists includes item information specifying one or more items reproduced in accordance with the lists and pointers represented by an offset from a leading end of the reproduction control information specifying another list to be linked, and wherein at least one of the lists is a second list including a plurality of said item data specifying a plurality of continuously reproduced items and a plurality of region data defining a region of an alternative for menu display of list contents.

4. The information recording medium as claimed in claim 3 wherein said first list includes region data defining the region of said alternative at a pre-set position.

5. The information recording medium as claimed in claim 3 wherein said second list includes region data defining the region of said alternative at an arbitrary position.

6. An information reproducing apparatus for reproducing a picture information and/or speech information from an information recording apparatus having recorded thereon the picture information and/or the speech information, a plurality of items consisting of said picture information and/or the speech information, and reproduction control information comprised of a plurality of lists for controlling the reproduction of said items, wherein at least a portion of the lists includes item information specifying one or more items reproduced in accordance with the lists and pointers represented by an offset from a leading end of the reproduction control information specifying another list to be linked, and wherein at least one of the lists is a first list including the item information specifying said one or more items, a plurality of pointers associated with plural lists branched according to user selection and a plurality of region data defining regions of alternatives for menu display of the contents of said pointers according to a priority sequence, comprising:

reproducing means for reproducing the information recorded on said information recording medium;

menu display control means for menu display of the contents of the first list in the priority sequence based upon the region data in the first list of the reproduction control data reproduced by said reproducing means, input means for inputting the selection information;

output means for outputting the picture information and/or the speech information reproduced by said reproducing means; and control means for controlling the reproduction of each item by said reproducing means based upon the item information of said reproduction control information reproduced by said reproducing means, said control means switching lists interpreted on the basis of said pointers when the entry of the selection information by said input means or the reproduction of all items indicated in said first list comes to a close.

7. The information reproducing apparatus as claimed in claim 6 wherein said menu display control means performs menu display control by a plurality of region data defining a plurality of rectangular regions associated with a same alternative in said first list.

8. An information reproducing apparatus for reproducing picture information and/or speech information from an information recording apparatus having recorded thereon the picture information and/or the speech information, a plurality of items consisting of said picture information and/or the speech information, and reproduction control information comprised of a plurality of lists for controlling the reproduction of said items, wherein at least a portion of the lists includes item information specifying one or more items reproduced in accordance with the lists and pointers represented by an offset from a leading end of the reproduction control information specifying another list to be linked, and wherein at least one of the lists is a second list including a plurality of said item data specifying a plurality of continuously reproduced items and a plurality of region data defining a region of an alternative for menu display of the list contents, comprising:

reproducing means for reproducing the information recorded on said information recording medium;

menu display control means for menu display of the contents of the second list based upon the region data in the second list of the reproduction control data reproduced by said reproducing means;

input means for inputting the selection information;

output means for outputting the picture information and/or the speech information reproduced by said reproducing means; and control means for controlling the reproduction of each item by said reproducing means based upon the item information of said reproduction control information reproduced by said reproducing means, said control means switching lists interpreted on the basis of said pointer when the entry of the selection information by said input means or the reproduction of all items indicated in said second list comes to a close.

9. The information reproducing apparatus as claimed in claim 8 wherein said menu display control means performs menu display control by the region data defining the region of said alternative in said second list at a pre-set position.

10. The information reproducing apparatus as claimed in claim 8 wherein said menu display control means performs menu display control by the region data defining the region of said alternative in said second list at a pre-set position.

\* \* \* \* \*

UNITED STATES PATENT AND TRADEMARK OFFICE
CERTIFICATE OF CORRECTION

PATENT NO. : 5,732,067
DATED : March 24, 1998
INVENTOR(S) : HIDENORI AOTAKE

It is certified that error appears in the above-indentified patent and that said Letters Patent is hereby corrected as shown below:

On the Title page, item [54] Title, and in col. 1, line 8;

Please replace "DISK" in the last line of the title with --DISC--.

Signed and Sealed this

Twenty-ninth Day of September, 1998

Attest:

BRUCE LEHMAN

*Attesting Officer*        *Commissioner of Patents and Trademarks*